(12) United States Patent
Tanski et al.

(10) Patent No.: US 12,051,022 B2
(45) Date of Patent: Jul. 30, 2024

(54) DISCRIMINATIVE MODEL FOR IDENTIFYING AND DEMARCATING TEXTUAL FEATURES IN RISK CONTROL DOCUMENTS

(71) Applicant: Capital One Services, LLC, McLean, VA (US)

(72) Inventors: Peter Tanski, Marlborough, MA (US); Matthew Peroni, Bedford, MA (US); Deny Daniel, Medford, MA (US); Ranjith Zachariah, Waltham, MA (US); Viji Soundar, Richmond, VA (US); Paul Vest, Bumpass, VA (US); Kevin Zhang, Braintree, MA (US)

(73) Assignee: Capital One Services, LLC, McLean, VA (US)

( * ) Notice: Subject to any disclaimer, the term of this patent is extended or adjusted under 35 U.S.C. 154(b) by 83 days.

(21) Appl. No.: 17/884,986

(22) Filed: Aug. 10, 2022

(65) Prior Publication Data
US 2024/0054421 A1    Feb. 15, 2024

Related U.S. Application Data

(63) Continuation-in-part of application No. 17/747,445, filed on May 18, 2022.

(51) Int. Cl.
*G06F 17/00*    (2019.01)
*G06F 40/211*    (2020.01)
(Continued)

(52) U.S. Cl.
CPC ....... *G06Q 10/0635* (2013.01); *G06F 40/211* (2020.01); *G06F 40/295* (2020.01); *G06F 40/40* (2020.01)

(58) Field of Classification Search
CPC . G06Q 10/0635; G06F 40/211; G06F 40/295; G06F 40/40
See application file for complete search history.

(56) References Cited

U.S. PATENT DOCUMENTS 8,306,818 B2    11/2012   Chelba et al.
10,769,570 B2 *    9/2020   Lu ..................... G06Q 10/0635
(Continued)

FOREIGN PATENT DOCUMENTS

CN    111159416 A    *    5/2020

*Primary Examiner* — Laurie A Ries
(74) *Attorney, Agent, or Firm* — Sterne, Kessler, Goldstein & Fox P.L.L.C.

(57) ABSTRACT

Embodiments disclosed are directed to a computing system that performs steps to automatically identify risk control features and entities in a risk control document. The computing system uses a generative machine learning (ML) model to transform a risk control document into sequences of words, classify risk control features associated with the sequences of words, and pair the sequences of words with the classified risk control features. The computing system then uses a natural language processing (NLP) model to identify syntactic characteristics of the sequences of words. Subsequently, the computing system uses a discriminative predictor system to correct the classified risk control features based on the identified syntactic characteristics, identify boundaries of the corrected classified risk control features, and pair the identified boundaries with the corrected classified risk control features.

20 Claims, 13 Drawing Sheets

(51) Int. Cl.
*G06F 40/295* (2020.01)
*G06F 40/40* (2020.01)
*G06Q 10/0635* (2023.01)

(56) References Cited

U.S. PATENT DOCUMENTS

| | | | |
|---|---|---|---|
| 11,048,738 B2 | 6/2021 | Duchin et al. | |
| 2009/0204596 A1* | 8/2009 | Brun | G06F 40/295 707/999.005 |
| 2014/0172417 A1* | 6/2014 | Monk, II | G06F 40/30 704/9 |
| 2016/0371618 A1 | 12/2016 | Leidner et al. | |
| 2017/0242840 A1* | 8/2017 | Lu | G06F 40/169 |
| 2019/0197442 A1* | 6/2019 | Lu | G06Q 20/4016 |
| 2020/0356922 A1 | 11/2020 | Engineer et al. | |
| 2020/0372423 A1 | 11/2020 | Sabharwal et al. | |
| 2021/0027379 A1 | 1/2021 | Zhu et al. | |
| 2021/0090174 A1 | 3/2021 | Altfest et al. | |
| 2021/0165964 A1 | 6/2021 | Jones | |
| 2021/0256436 A1* | 8/2021 | Nag | G06F 40/30 |

* cited by examiner

DISCRIMINATIVE MODEL FOR IDENTIFYING AND DEMARCATING TEXTUAL FEATURES IN RISK CONTROL DOCUMENTS

RELATED APPLICATION

The present application is a continuation-in-part application that claims priority benefit, with regard to all common subject matter, of earlier-filed U.S. patent application Ser. No. 17/747,445, filed May 18, 2022, entitled "HYBRID MODEL AND SYSTEM FOR PREDICTING QUALITY AND IDENTIFYING FEATURES AND ENTITIES OF RISK CONTROLS".

TECHNICAL FIELD

Embodiments relate to training machine learning (ML) models, specifically a system that trains one or more ML models to automatically identify risk control features and entities in a risk control document, automatically suggest a word, phrase, or entity to complete a sequence in a risk control document, or a combination thereof.

BACKGROUND

Risk control documents are natural language documents that describe organizational requirements and actions to mitigate an identified risk or risks. There are tens of thousands of risk controls, with more being created every day. Many existing systems use rule-based methods in an attempt to identify key features required of quality controls. However, using rule-based methods to successfully identify key features required of quality controls is tedious and impractical given the many rules that would have to be identified and defined manually, and does not generalize well to new language that has not been seen before.

SUMMARY

Provided herein are system, apparatus, article of manufacture, method and/or computer program product embodiments, and/or combinations and sub-combinations thereof, for automatically identifying risk control features and entities in a risk control document.

In some embodiments, the technology described herein implements a system and method that analyzes risk mitigation text within a risk control document to determine risk control components located within the text, where the text defines one or more measures to provide assurance of compliance with organizational process requirements. Controls may be manual, automated or hybrid auditable activities that prevent or detect business process errors in service of mitigating risks to a business. In some embodiments, the technology disclosed herein provides a systematic codification of an organization's risk controls.

Several embodiments are directed to computer-implemented methods for combining predictive processing systems with domain specific processing systems. Predictive processing systems may include machine learning (ML) systems implemented with one or more predictive models. Domain specific processing systems may include Natural Language Processing (NLP) systems configured to consider syntax, context and grammatical rules. In some embodiments, the ML system and NLP system each process a same risk control document with one or more results from the ML system evaluated by, or corrected by, one or more results from the NLP system.

In a non-limiting example, the ML system may identify a risk control feature within the risk control document and the NLP system may subsequently identify a proper feature segmentation for the identified risk control feature. For example, the ML system may infer, from the risk control document, a name of "who" within Company A will be responsible to enforce a risk mitigation task. However, in one instance, the ML system does not properly capture the entire entity name as set forth in the risk control document. The NLP system may correct or modify the entity name inferred by the ML system to include a complete or correct name or by identifying a proper feature segmentation.

Several embodiments are directed to computer-implemented methods for automatically identifying risk control features and entities in a risk control document. For example, a computer-implemented method can include transforming, by a generative machine learning (ML) model, a risk control document into sequences of words. The computer-implemented method can further include classifying, by the generative ML model, risk control features associated with the sequences of words. The computer-implemented method can further include pairing, by the generative ML model, the sequences of words with the classified risk control features. The computer-implemented method can further include identifying, by a natural language processing (NLP) model, syntactic characteristics of the sequences of words. The computer-implemented method can further include correcting, by a discriminative predictor system, the classified risk control features based on the identified syntactic characteristics. The computer-implemented method can further include identifying, by the discriminative predictor system, boundaries of the corrected classified risk control features. The computer-implemented method can further include pairing, by the discriminative predictor system, the identified boundaries with the corrected classified risk control features.

Several embodiments are directed to non-transitory computer readable media for automatically identifying risk control features and entities in a risk control document. For example, a non-transitory computer readable medium can include instructions for causing a processor to perform operations for automatically identifying risk control features and entities in a risk control document. The operations can include transforming, by a generative ML model, a risk control document into sequences of words. The operations can further include classifying, by the generative ML model, risk control features associated with the sequences of words. The operations can further include pairing, by the generative ML model, the sequences of words with the classified risk control features. The operations can further include identifying, by an NLP model, syntactic characteristics of the sequences of words. The operations can further include correcting, by a discriminative predictor system, the classified risk control features based on the identified syntactic characteristics. The operations can further include identifying, by the discriminative predictor system, boundaries of the corrected classified risk control features. The operations can further include pairing, by the discriminative predictor system, the identified boundaries with the corrected classified risk control features.

Several embodiments are directed to computing systems for automatically identifying risk control features and entities in a risk control document. For example, a computing system can include a storage unit configured to store instructions. The computing system can further include a control unit, coupled to the storage unit, configured to process the stored instructions to perform operations including transforming, by a generative ML model, a risk control document into sequences of words. The operations can further include classifying, by the generative ML model, risk control features associated with the sequences of words. The operations can further include pairing, by the generative ML model, the sequences of words with the classified risk control features. The operations can further include identifying, by an NLP model, syntactic characteristics of the sequences of words. The operations can further include correcting, by a discriminative predictor system, the classified risk control features based on the identified syntactic characteristics. The operations can further include identifying, by the discriminative predictor system, boundaries of the corrected classified risk control features. The operations can further include pairing, by the discriminative predictor system, the identified boundaries with the corrected classified risk control features.

The technology described herein solves one or more technical problems that exist in the realm of machine learning computer systems. For example, in some instances, specific grammar and syntax used for feature segmentation may be absent or diminished during machine learning processing. The cooperative interaction with NLP domain specific data improves an identification of risk control features. Therefore, one or more solutions described herein are necessarily rooted in computer technology in order to overcome the problems specifically arising in the realm of machine learning, fuzzy logic, deep learning, neural networks or equivalents.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art to make and use the embodiments.

DETAILED DESCRIPTION

Figure 1A:
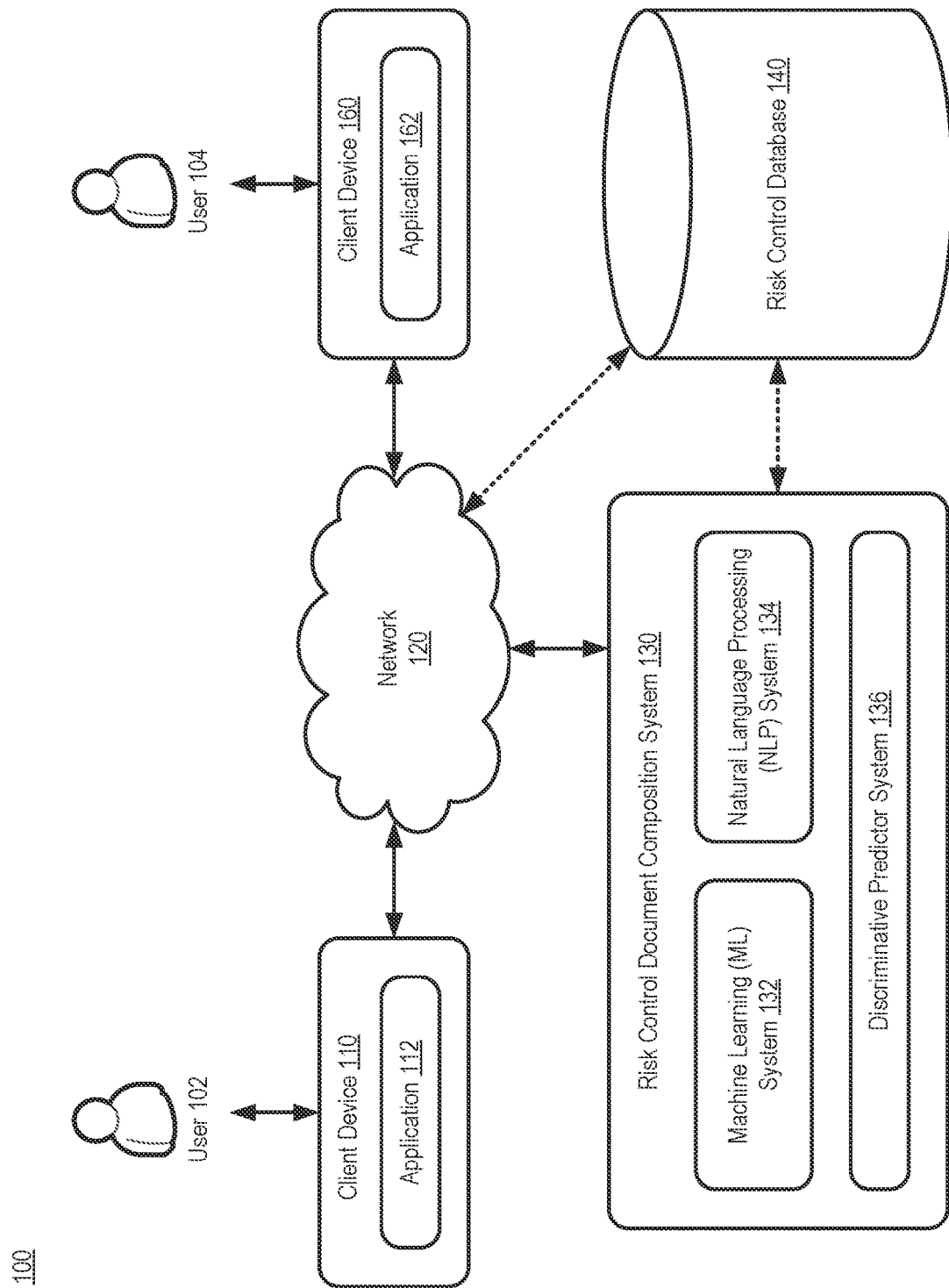
FIGS. 1A and 1B are schematic illustrations of an example system for automatically identifying risk control features and entities in a risk control document, automatically suggesting a word, phrase, or entity to complete a sequence in a risk control document, or both, according to some embodiments.

Embodiments disclosed herein relate to systems and methods for automatically identifying risk control features and entities in a risk control document, automatically suggesting a word, phrase, or entity to complete a sequence in a risk control document, or both. For example, the hybrid machine learning (ML) and natural language processing (NLP) systems, models, and training processes disclosed herein provide a generalized model for risk control feature identification and risk control quality prediction that is not rule-based and thus is faster and uses fewer computing resources (e.g., memory, central processing unit (CPU) usage, cloud resources, etc.) than rule-based methods and also generalizes well to new language that has not been seen before.

The following embodiments are described in sufficient detail to enable those skilled in the art to make and use the disclosure. It is to be understood that other embodiments are evident based on the present disclosure, and that system, process, or mechanical changes may be made without departing from the scope of an embodiment of the present disclosure.

In the following description, numerous specific details are given to provide a thorough understanding of the disclosure. However, it will be apparent that the disclosure may be practiced without these specific details. In order to avoid obscuring an embodiment of the present disclosure, some circuits, system configurations, architectures, and process steps are not disclosed in detail.

The drawings showing embodiments of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure may be operated in any orientation.

The term "module," "model," or "unit" referred to herein may include software, hardware, or a combination thereof in an embodiment of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, or a combination thereof. Further, if a module or unit is written in the system or apparatus claim section below, the module or unit is deemed to include hardware circuitry for the purposes and the scope of the system or apparatus claims.

The term "service" or "services" referred to herein can include a collection of modules or units. A collection of modules or units may be arranged, for example, in software or hardware libraries or development kits in embodiments of the present disclosure in accordance with the context in which the term is used. For example, the software or hardware libraries and development kits may be a suite of data and programming code, for example pre-written code, classes, routines, procedures, scripts, configuration data, or a combination thereof, that may be called directly or through an application programming interface (API) to facilitate the execution of functions of the system.

The modules, models, units, or services in the following description of the embodiments may be coupled to one another as described or as shown. The coupling may be direct or indirect, without or with intervening items between coupled modules, units, or services. The coupling may be by physical contact or by communication between modules, units, or services.

Overview of Systems and Functions

FIG. 1A shows a system 100 for automatically identifying risk control features and entities in a risk control document, automatically suggesting a word, phrase, or entity to complete a sequence in a risk control document, or both, according to some embodiments. In several embodiments, system 100 can include a client device 110 associated with a user 102, a client device 160 associated with a user 104, a network 120, a risk control document composition system 130, and a risk control database 140. In several embodiments, the client device 110 can include an application 112, the client device 160 can include an application 162, and the risk control document composition system 130 can include a machine learning (ML) system 132, a natural language processing (NLP) system 134, and a discriminative predictor system 136.

The client device 110 and the client device 160 may be any of a variety of centralized or decentralized computing devices. For example, one or both of the client device 110 and the client device 160 may be a mobile device, a laptop computer, or a desktop computer. In several embodiments, one or both of the client device 110 and the client device 160 can function as a stand-alone device separate from other devices of the system 100. The term "stand-alone" can refer to a device being able to work and operate independently of other devices. In several embodiments, the client device 110 and the client device 160 can store and execute the application 112 and the application 162, respectively.

Each of the application 112 and the application 162 may refer to a discrete software that provides some specific functionality. For example, the application 112 and the application 162 each may be a mobile application that allows the user 102 to perform some functionality, whereas the application 162 may be a mobile application that allows the user 104 to perform some functionality. In other embodiments, one or more of the application 112 and the application 162 may be a desktop application that allows the user 102 or the user 104 to perform the functionalities described herein. In still other embodiments, one or more of the application 112 and the application 162 may be an application that allows the user 102 or the user 104 to communicate electronically with the risk control document composition system 130.

In several embodiments, the client device 110 and the client device 160 can be coupled to the risk control document composition system 130 via a network 120. In some embodiments, the risk control document composition system 130 may be part of a computing infrastructure, including a server infrastructure of a company or institution, to which the application 112 and the application 162 belong. While the risk control document composition system 130 is described and shown as a single component in FIG. 1A, this is merely an example. In several embodiments, the risk control document composition system 130 can include a variety of centralized or decentralized computing devices. For example, the risk control document composition system 130 may include a mobile device, a laptop computer, a desktop computer, grid-computing resources, a virtualized computing resource, cloud computing resources, peer-to-peer distributed computing devices, a server farm, or a combination thereof. The risk control document composition system 130 may be centralized in a single room, distributed across different rooms, distributed across different geographical locations, or embedded within the network 120. While the devices including the risk control document composition system 130 can couple with the network 120 to communicate with the client device 110 and the client device 160, the devices of the risk control document composition system 130 can also function as stand-alone devices separate from other devices of the system 100.

In several embodiments, the risk control document composition system 130 can couple to the client device 110 to allow the application 112 to function. For example, in several embodiments, both the client device 110 and the risk control document composition system 130 can have at least a portion of the application 112 installed thereon as instructions on a non-transitory computer readable medium. The client device 110 and the risk control document composition system 130 can both execute portions of the application 112 using client-server architectures, to allow the application 112 to function.

In several embodiments, the risk control document composition system 130 can couple to the client device 160 to allow the application 162 to function. For example, in several embodiments, both the client device 160 and the risk control document composition system 130 can have at least a portion of the application 162 installed thereon as instructions on a non-transitory computer readable medium. The client device 160 and the risk control document composition system 130 can both execute portions of the application 162 using client-server architectures, to allow the application 162 to function.

In several embodiments, if the risk control document composition system 130 is implemented using cloud computing resources, the cloud computing resources may be resources of a public or private cloud. Examples of a public cloud include, without limitation, Amazon Web Services (AWS)™, IBM Cloud™, Oracle Cloud Solutions™, Microsoft Azure Cloud™, and Google Cloud™. A private cloud refers to a cloud environment similar to a public cloud with the exception that it is operated solely for a single organization.

In several embodiments, the network 120 can include a telecommunications network, such as a wired or wireless network. The network 120 can span and represent a variety of networks and network topologies. For example, the network 120 can include wireless communications, wired communications, optical communications, ultrasonic communications, or a combination thereof. For example, satellite communications, cellular communications, Bluetooth, Infrared Data Association standard (IrDA), wireless fidelity (Wi-Fi), and worldwide interoperability for microwave access (WiMAX) are examples of wireless communications that may be included in the network 120. Cable, Ethernet, digital subscriber line (DSL), fiber optic lines, fiber to the home (FTTH), and plain old telephone service (POTS) are examples of wired communications that may be included in the network 120. Further, the network 120 can traverse a number of topologies and distances. For example, the network 120 can include a direct connection, personal area network (PAN), local area network (LAN), metropolitan area network (MAN), wide area network (WAN), or a combination thereof. For illustrative purposes, in the embodiment of FIG. 1A, the system 100 is shown with the client device 110, the client device 160, the risk control document composition system 130, and the risk control database 140 as end points of the network 120. This, however, is an example and it is to be understood that the system 100 can have a different partition between the client device 110, the client device 160, the risk control document composition system 130, the risk control database 140, and the network 120. For example, the client device 110, the client device 160, the risk control document composition system 130, and the risk control database 140 can also function as part of the network 120.

Figure 1B:
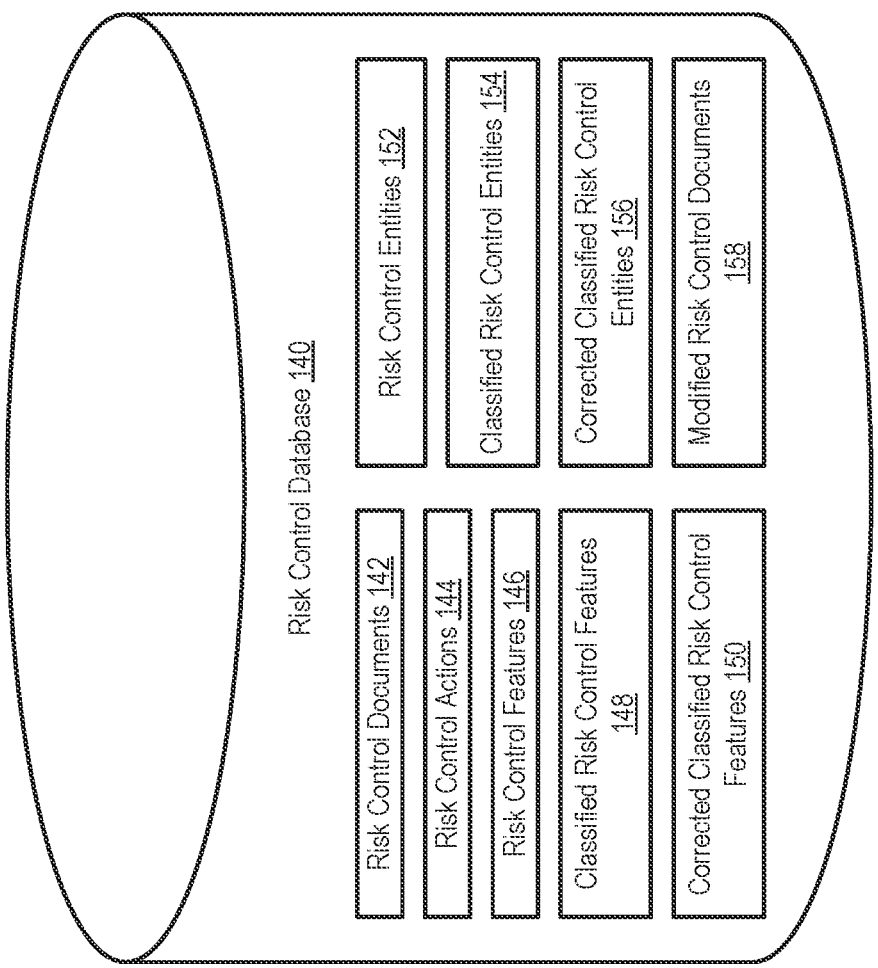

FIG. 1B shows the risk control database 140 in greater detail. In several embodiments, the risk control database 140 may be a database or repository used to store risk control data, any other suitable data, or any combination thereof. For example, the risk control database 140 can store, in a list or as table entries, one or more risk control documents 142, risk control actions 144, risk control features 146, classified risk control features 148, corrected classified risk control features 150, risk control entities 152, classified risk control entities 154, corrected classified risk control entities 156, and modified risk control documents 158. For each risk control document 150 or modified risk control document 158, the risk control database 140 can further store, in a list or as table entries, one or more phrases, regenerated phrase, tags (e.g., beginning-inside-outside (BIO) tags), tagged regenerated phrases, masked phrases, regenerated masked phrases, matched regenerated masked phrases, any other suitable electronic information, or any combination thereof. For each risk control document 150 or modified risk control document 158, the risk control database 140 can further store, in a list or as table entries, one or more suggested words, phrases, or entities to complete a sequence following a cursor position in the risk control document; corrected suggested words, phrases, or entities; encoded sequences of word, phrase, or entity suggestions; any other suitable electronic information; or any combination thereof.

Referring to FIGS. 1A and 1B, as a foundation for several embodiments, the risk control document composition system 130 can perform various operations for automatically identifying, classifying, and correcting risk control features 146 and risk control entities 152 in a risk control document. In several embodiments, the risk control document composition system 130 can regenerate, by a semantic prediction ML model implemented using the ML system 132, phrases 180 in a risk control document 142. The semantic prediction ML model can include, for example, an attention-based transformer neural network that includes neural network layers specialized for risk control documents. In several embodiments, the semantic prediction ML model can be trained, for example, by a process that includes: (i) receiving, by the semantic prediction ML model, a corpus of risk control documents; (ii) generating, by the semantic prediction ML model for each risk control document 142 in the corpus of risk control documents, a modified risk control document 158 by performing modification operations on the respective risk control document 142 including, but not limited to, replacing words with synonyms of the words, inserting punctuation, removing punctuation, changing sentences from active voice to passive voice, changing sentences from passive voice to active voice, or a combination thereof; (iii) masking, by the semantic prediction ML model, phrases in each modified risk control document 158; (iv) regenerating, by the semantic prediction ML model, the masked phrases in each modified risk control document 158; (v) classifying, by the semantic prediction ML model, the risk control features 146 associated with the regenerated masked phrases to generate classified risk control features 148; (vi) matching, by the discriminative NLP model, the regenerated masked phrases with corresponding phrases in the corpus of risk control documents 142; and (vii) determining, by the discriminative NLP model, whether each of the classified risk control features 148 is correct based on the matched regenerated masked phrases.

In several embodiments, the risk control document composition system 130 can classify, by the semantic prediction ML model, risk control features 146 associated with the regenerated phrases in the risk control document 142. The risk control features 146 can include, but are not limited to, for example: (i) a first risk control feature indicative of a risk control entity 152 responsible for performing a risk control action 144 identified in the risk control document 142; (ii) a second risk control feature indicative of when the risk control action 144 is to be performed; (iii) a third risk control feature indicative of a description (e.g., a textual description) of the risk control action 144; (iv) a fourth risk control feature indicative of a reason for the risk control action 144; and (v) a fifth risk control feature indicative of how a risk is mitigated by a performance of the risk control action 144.

In several embodiments, the risk control document composition system 130 can correct, by a discriminative NLP model implemented using the NLP system 134, the classified risk control features 148 based on the phrases and the regenerated phrases in the risk control document 142 to generate corrected classified risk control features 150.

In several embodiments, the risk control document composition system 130 can classify, by the semantic prediction ML model, risk control entities 152 in the risk control document 142 to generate classified risk control entities 154. In several embodiments, the risk control document composition system 130 can correct, by the discriminative NLP model, the classified risk control entities 154 based on the corrected classified risk control features 150 to generate corrected classified risk control entities 156.

In several embodiments, the risk control document composition system 130 can predict, by the semantic prediction ML model, a first quality value (e.g., on a scale of 0 to 100, a scale of 0.00 to 1.00, an unscaled value, etc.) for the risk control document 142 based on the classified risk control features 148. In several embodiments, the risk control document composition system 130 can determine, by a discriminative predictor system 136, a second quality value (e.g., on a scale of 0 to 100, a scale of 0.00 to 1.00, an unscaled value, etc.) for the risk control document 142 based on the first quality value and the corrected classified risk control features 150. In several embodiments, the second quality value may be different from the first quality value.

In several embodiments, the risk control document composition system 130 can tag, by the semantic prediction ML model, the regenerated phrases with beginning-inside-outside (BIO) tags to generate tagged regenerated phrases, wherein each respective regenerated phrase is tagged with a respective BIO tag indicative of a respective classified risk control feature 148 associated with the respective regenerated phrase. In several embodiments, the risk control document composition system 130 can correct, by the discriminative NLP model, the classified risk control features 148 further based on the tagged regenerated phrases to generate the corrected classified risk control features 150.

Referring to FIGS. 1A and 1B, as a foundation for several embodiments, the risk control document composition system 130 can perform various operations for automatically suggesting a word, phrase, or entity to complete a sequence in a risk control document 142. In several embodiments, the risk control document composition system 130 can classify, by a generative ML model implemented using the ML system 132, risk control features 146 associated with phrases in a risk control document 142. The generative ML model can include, for example, a bidirectional encoder and an autoregressive decoder. In several embodiments, the generative ML model can be trained, for example, by a process that includes: (i) receiving, by the generative ML model, a corpus of risk control documents; (ii) generating, by the generative ML model for each risk control document 142 in the corpus of risk control documents, a modified risk control document 158 by performing modification operations on the respective risk control document 142 including, but not limited to, replacing words with synonyms of the words, inserting punctuation, removing punctuation, changing sentences from active voice to passive voice, changing sentences from passive voice to active voice, or a combination thereof; (iii) masking, by the generative ML model, phrases in each modified risk control document 158; (iv) regenerating, by the generative ML model, the masked phrases in each modified risk control document 158; (v) classifying, by the generative ML model, the risk control features 146 associated with the regenerated masked phrases to generate classified risk control features 148; (vi) matching, by the discriminative NLP model, the regenerated masked phrases with corresponding phrases in the corpus of risk control documents 142; and (vii) determining, by the discriminative NLP model, whether each of the classified risk control features 148 is correct based on the matched regenerated masked phrases.

In several embodiments, the risk control document composition system 130 can generate, by the generative ML model and based on the classified risk control features 148, suggested words, phrases, or entities to complete a sequence following a cursor position in the risk control document 142. In one example, in operation 1004, the risk control document composition system 130 can generate, by the generative ML model and based on the classified risk control features 148, a suggested entity name to complete the sequence following the cursor position in the risk control document 142.

In several embodiments, the risk control document composition system 130 can correct, by a discriminative NLP model implemented using the NLP system 134, the suggested words, phrases, or entities based on the risk control document 142 and the cursor position. In one example, following the example described above with reference to operation 1004, in operation 1006 the risk control document composition system 130 can: determine, by the generative ML model, whether the suggested entity name was used in the risk control document 142 prior to the cursor position; and correct, by the discriminative NLP model, the suggested entity name in response to determining that the suggested entity name was used in the risk control document 142 prior to the cursor position, where the corrected suggested entity name includes an abbreviation for the suggested entity name.

In several embodiments, the risk control document composition system 130 can generate, by a discriminative predictor system 136, an encoded sequence of word, phrase, or entity suggestions based on the cursor position, the classified risk control features 148, and the corrected suggested words, phrases, or entities.

In several embodiments, the risk control document composition system 130 can generate, by the generative ML model and based on the cursor position, a start token indicative of a beginning position for the suggested words, phrases, or entities. In several embodiments, the risk control document composition system 130 can predict, by the generative ML model and based on the phrases and the classified risk control features 148, a stop token indicative of an ending position for the suggested words, phrases, or entities. In several embodiments, the risk control document composition system 130 can generate, by the generative ML model, the suggested words, phrases, or entities further based on the start token and the stop token.

In several embodiments, the risk control document composition system 130 can tag, by the generative ML model, the phrases with BIO tags, wherein each respective phrase is tagged with a respective BIO tag indicative of a respective classified risk control feature 148 associated with the respective phrase. In several embodiments, the risk control document composition system 130 can correct, by the discriminative NLP model, the suggested words, phrases, or entities further based on the tagged phrases.

Referring to FIGS. 1A and 1B, as a foundation for several embodiments, the risk control document composition system 130 can perform various additional operations for automatically identifying, classifying, and correcting risk control features 146 and risk control entities 152 in a risk control document 142. In several embodiments, the risk control document composition system 130 can transform, by a generative ML model implemented using the ML system 132, a risk control document 142 into sequences of words. The generative ML model can include, for example, an attention-based transformer neural network that includes neural network layers specialized for risk control documents.

In several embodiments, the risk control document composition system 130 can classify, by the generative ML model, risk control features 146 associated with the sequences of words to generate classified risk control features 148. In several embodiments, the risk control document composition system 130 can pair, by the generative ML model, the sequences of words with the classified risk control features 148. In several embodiments, the risk control document composition system 130 can identify, by an NLP model implemented using the NLP system 134, syntactic characteristics of the sequences of words.

In several embodiments, the risk control document composition system 130 can correct, by a discriminative predictor system 136, the classified risk control features 148 based on the identified syntactic characteristics to generate corrected classified risk control features 150. In several embodiments, the risk control document composition system 130 can identify, by the discriminative predictor system 136, boundaries of the corrected classified risk control features 150. In several embodiments, the risk control document composition system 130 can pair, by the discriminative predictor system 136, the identified boundaries with the corrected classified risk control features 150.

In several embodiments, the risk control document composition system 130 can classify, by the generative ML model, risk control entities 152 in the risk control document 142 to generate classified risk control entities 154. In several embodiments, the risk control document composition system 130 can correct, by the discriminative predictor system 136, the classified risk control entities 154 based on the corrected classified risk control features 150 to generate corrected classified risk control entities 156.

In several embodiments, the risk control document composition system 130 can predict, by the generative ML model, a first quality value for the risk control document 142 based on the classified risk control features 148. In several embodiments, the risk control document composition system 130 can determine, by the discriminative predictor system 136, a second quality value for the risk control document 142 based on the first quality value and the corrected classified risk control features 150. In several embodiments, the second quality value may be different from the first quality value.

In several embodiments, the risk control document composition system 130 can tag, by the generative ML model, the sequences of words with BIO tags to generate tagged sequences of words, wherein each respective sequence of words is tagged with a respective BIO tag indicative of a respective classified risk control feature 148 associated with the respective sequence of words. In several embodiments, the risk control document composition system 130 can correct, by the NLP model, the classified risk control features 148 further based on the tagged sequence of words to generate the corrected classified risk control features 150.

Figure 2:
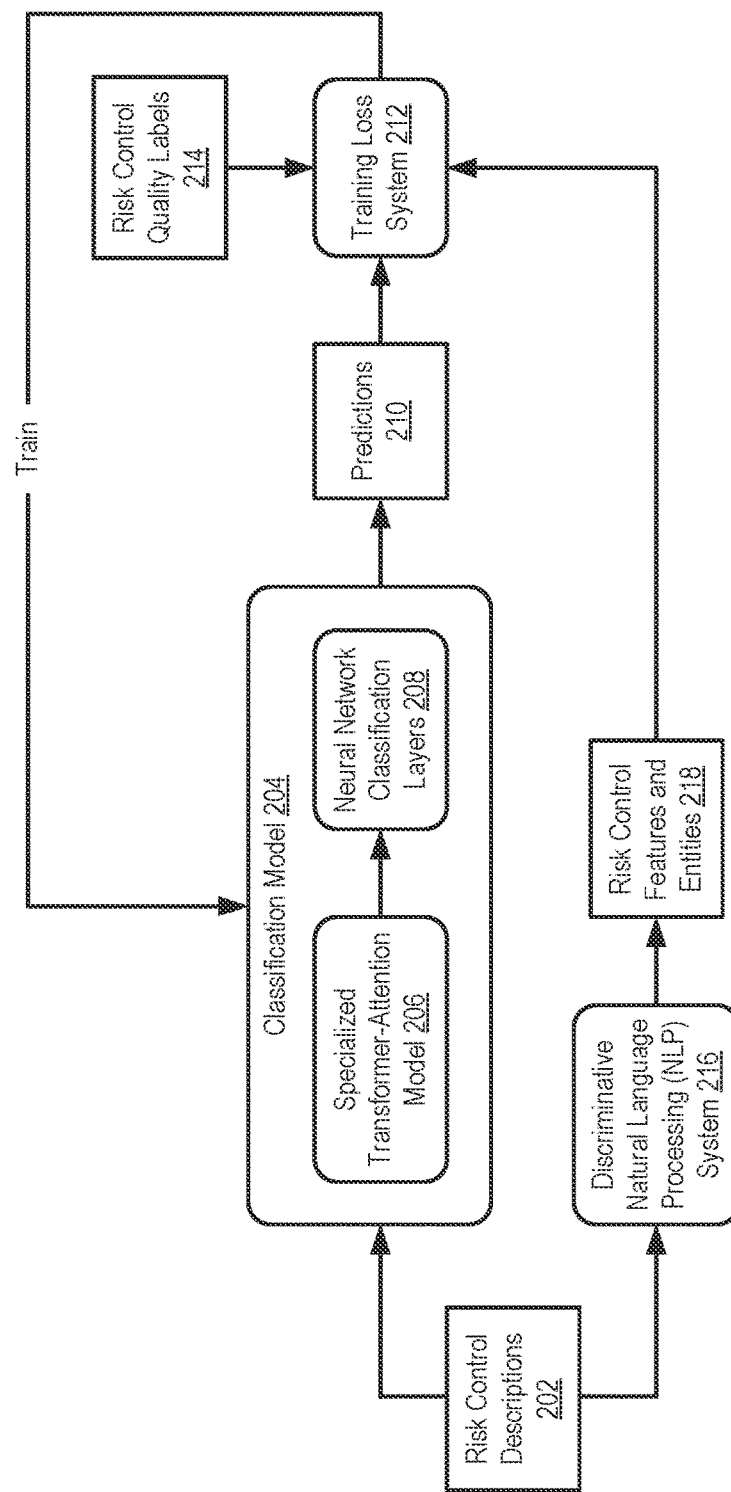
FIG. 2 is a schematic illustration of an example risk control document composition system according to some embodiments.

FIG. 2 is a block diagram of a risk control document composition system 200 for training an ML model for predicting the quality and features of risk control documents, according to some embodiments. In several embodiments, the risk control document composition system 200 may be an extended configuration of the risk control document composition system 130 and the risk control database 140 described with reference to FIGS. 1A and 1B. In several embodiments, the risk control document composition system 200 can be configured to incorporate risk control features and entities in the document text identified by NLP techniques into the training of a neural network. As shown in FIG. 2, the risk control document composition system 200 can include a classification model 204 (e.g., a target (training) model), a training loss system 212, or a discriminative NLP system 216.

In several embodiments, the classification model 204 can include an attention-based transformer neural network, with the addition of several neural network layers specialized for risk control documents. For example, the classification model 204 can include a specialized transformer-attention model 206 and neural network classification layers 208.

In several embodiments, the risk control document composition system 200 can be configured to train the classification model 204 to identify risk control features of, and risk control entities in, risk control documents and provide a score of the quality of risk control documents. For example, the risk control document composition system 200 can be configured to transmit risk control descriptions 202 to the classification model 204. The training loss system 212 can be configured to transmit training data to the classification model 204. The classification model 204 can be configured to receive the risk control descriptions 202 and training data as inputs, generate predictions 210 based on the risk control descriptions 202 and the training data, and transmit the predictions 210 to the training loss system 212.

In several embodiments, the discriminative NLP system 216 can include a fixed model for syntactic prediction, such as a natural language model with embedded rules for identifying risk control features of, and risk control entities in, risk control documents. For example, the risk control document composition system 200 can be configured to transmit risk control descriptions 202 to the discriminative NLP system 216. The discriminative NLP system 216 can be configured to receive the risk control descriptions 202 as inputs, generate risk control features and entities 218 based on the risk control descriptions 202, and transmit the risk control features and entities 218 to the training loss system 212. In several embodiments, the discriminative NLP system 216 may not be trained during this process. Rather, the risk control document composition system 200 can utilize the output of the discriminative NLP system 216 (e.g., the risk control features and entities 218) to train the classification model 204.

In several embodiments, the training loss system 212 can be configured to label the risk control documents by control quality. For example, the risk control document composition system 200 can be configured to transmit risk control quality labels 214 to the training loss system 212. The training loss system 212 can be configured to receive the risk control quality labels 214, the predictions 210, and the risk control features and entities 218 as inputs, generate training data based thereon, and transmit the training data to the classification model 204. In this way, the risk control document composition system 200 can be configured to train the classification model 204 by incorporating the risk control quality labels 214 from the training loss system 212 and the presence or absence of key risk control features (e.g., the risk control features and entities 218) identified by the discriminative NLP system 216 into the loss function, as shown in FIG. 2. There are many exemplary aspects (e.g., advantages) to this design for the loss function, including, but not limited to: (i) correctly predicting if the overall quality of a risk control is acceptable; and (ii) identifying the presence or absence of key risk control features.

Figure 3:
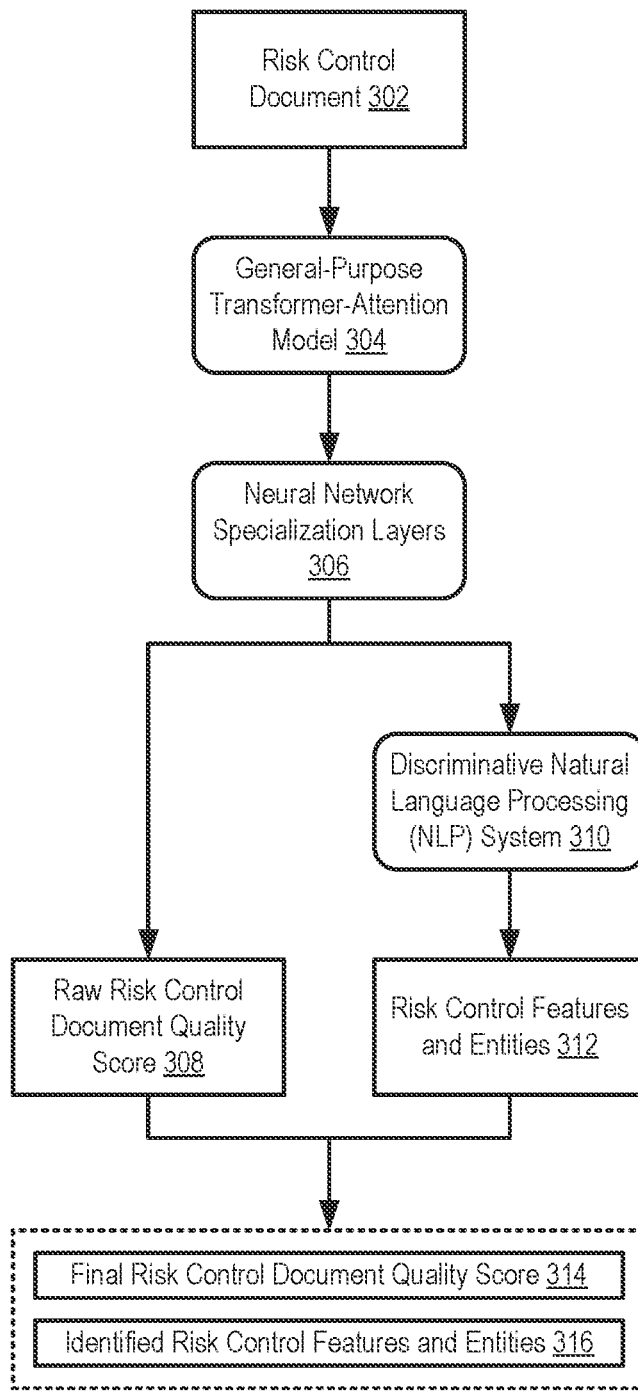
FIG. 3 is a schematic illustration of another example risk control document composition system according to some embodiments.

FIG. 3 is a block diagram of a risk control document composition system 300 for predicting the quality of risk control documents and identifying textual risk control features and entities in the risk control document that are relevant to risk controls and actions, according to some embodiments. In several embodiments, the risk control document composition system 300 may be an extended configuration of the risk control document composition system 130 and the risk control database 140 described with reference to FIGS. 1A and 1B. As shown in FIG. 3, the risk control document composition system 300 can include a general-purpose transformer-attention model 304, a neural network specialization layers 306, and a discriminative NLP system 310.

In several embodiments, the risk control document composition system 300 can include a hybrid machine learning model and system for processing risk control documents that includes: (i) a model for semantic prediction, such as an attention-based transformer neural network, with the addition of several neural network layers specialized for risk control documents; and (ii) a discriminative model and system for syntactic risk control feature detection and labeling, such as a combination NLP model with embedded rules for identifying risk control features of, and risk control entities in, risk Control documents. By combining semantic and syntactic models, the risk control document composition system 300 can be configured to identify parts of a risk control document that contribute to its quality or efficacy. For example, the risk control document composition system 300 can predict the quality of a risk control document. In another example, the risk control document composition system 300 can detect, identify, and segment words, phrases, and sentences that are risk control features of risk control documents. In yet another example, the risk control document composition system 300 can provide for faster processing of risk control documents such that the risk control document composition system 300 is suitable for online, interactive use, providing a user with feedback in real time or near real time. There are many exemplary aspects to this hybrid model, including, but not limited to: (i) using a discriminative model to boost the output from a generative model requires much less data to train than a purely generative model; and (ii) the outputs may be fine-tuned with supplementary domain specific data to increase relevance of results to the risk control.

In several embodiments, the risk control document composition system 300 can be configured to transmit a risk control document 302 to the general-purpose transformer-attention model 304. The general-purpose transformer-attention model 304 can be configured to receive the risk control document 302 as input, process the risk control document 302, and transmit its output to the neural network specialization layers 306. The neural network specialization layers 306 can be configured to receive the output of the general-purpose transformer-attention model 304 as input and generate a raw risk control document quality score 308. The discriminative NLP system 310 can be configured to receive the output of the general-purpose transformer-attention model 304 as input, generate risk control features and entities 312 based on the general-purpose transformer-attention model 304, and output the risk control features and entities 312. Subsequently, the risk control document composition system 300 can be configured to generate a final risk control document quality score 314 and identified risk control features and entities 316 based on the raw risk control document quality score 308 output by the neural network specialization layers 306 and the risk control features and entities 312 output by the discriminative NLP system 310.

Figure 4:
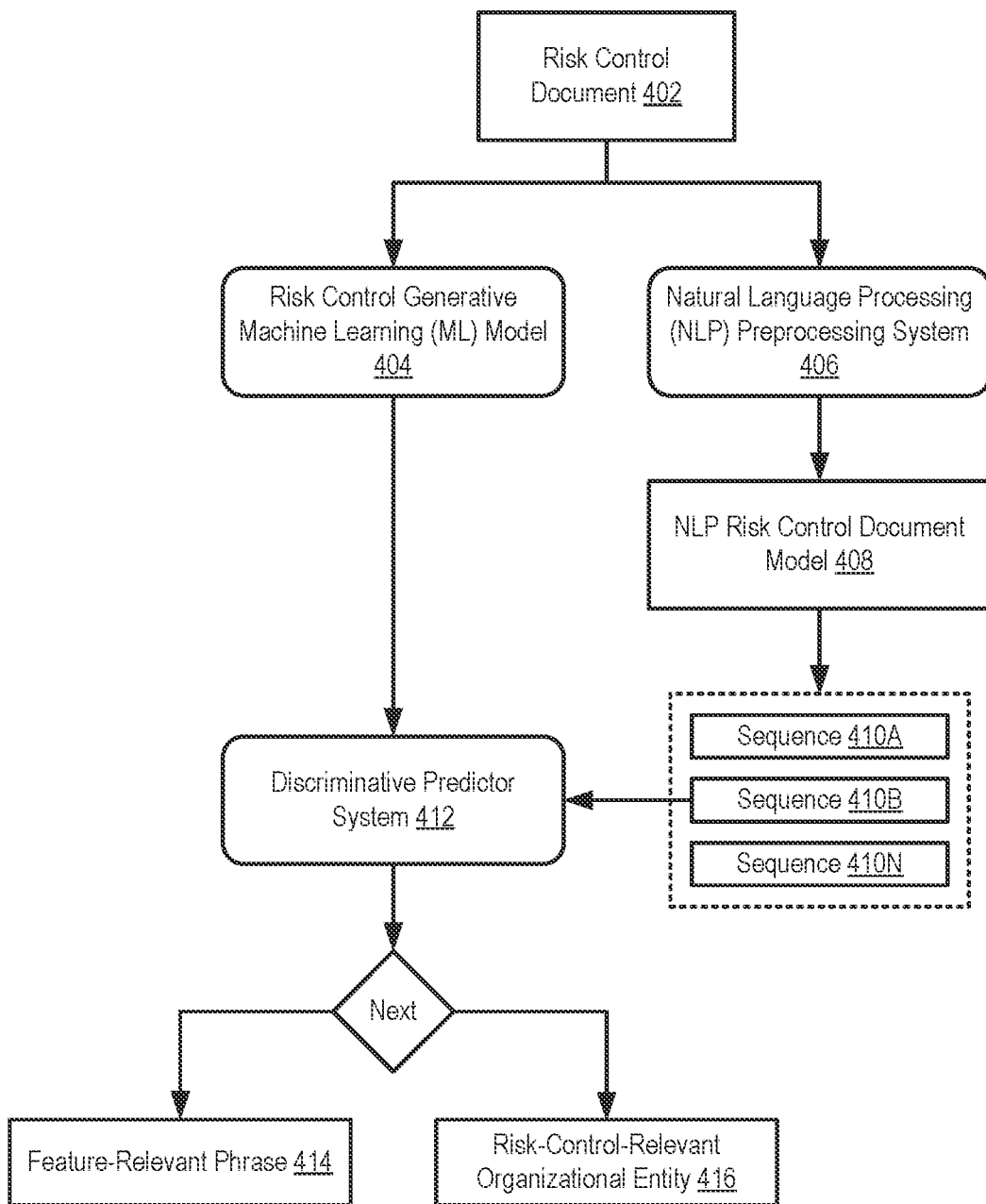
FIG. 4 is a schematic illustration of another example risk control document composition system according to some embodiments.

FIG. 4 is a block diagram of a risk control document composition system 400 for suggesting a word, phrase, or entity to complete a sequence in a risk control document, according to some embodiments. In several embodiments, the risk control document composition system 400 may be an extended configuration of the risk control document composition system 130 and the risk control database 140 described with reference to FIGS. 1A and 1B. As shown in FIG. 4, the risk control document composition system 400 can include a risk control generative ML model 404, an NLP preprocessing system 406, an NLP risk control document model 408, and a discriminative predictor system 412.

In several embodiments, the risk control document composition system 400 can be configured to accept a textual risk control document 402 and process the textual risk control document 402 through a generative model specialized for risk controls to output an encoded sequence of suggestions. Given sequences of text in the risk control document 402, the generative model can be configured to output suggested words or phrases, including named entities. There are many exemplary aspects to this model, including, but not limited to: (i) using a discriminative model to boost the output from a generative model requires much less data to train; and (ii) the outputs may be fine-tuned with supplementary domain specific data to increase relevance of results to the risk control. The supplementary domain specific data can include, for example, a knowledge graph or a deep learning model trained to classify features in a domain specific context, where the model can use an inception score (e.g., divergence between conditional and marginal distributions) to choose the suggestion to display to a user.

In several embodiments, the word, phrase, or entity predicted by the risk control document composition system 400 can be semantically relevant to a key risk control feature in a risk control included in a risk control document, including, but not limited to:

1. Why—the reason for the risk control; why is the risk control needed.
2. Who—the organizational entity or team responsible for performing the risk control activity.
3. What—what risk control activity is being performed.
4. When—when is the risk control activity being performed (e.g., frequency and trigger point(s)).
5. How—how is the risk being mitigated.

In several embodiments, the risk control generative ML model 404 can include a generative machine learning model specialized for risk control documents through additional layers and training. In several embodiments, the discriminative predictor system 412 can include a discriminative predictor process that is capable of boosting the output from the generative model and further specializing predictions to the context of the Risk Control Document.

In several embodiments, the risk control document composition system 400 can be configured to transmit a risk control document 402 to the risk control generative ML model 404 and the NLP preprocessing system 406. The risk control generative ML model 404 can be configured to receive the risk control document 402 as input, process the risk control document 402, and transmit its output to the discriminative predictor system 412.

The NLP preprocessing system 406 can be configured to receive the risk control document 402 as input, process the risk control document 402, and transmit its output to the NLP risk control document model 408. The NLP risk control document model 408 can be configured to receive the output of the NLP preprocessing system 406 as input, generate sequences 410A-410N based on the input, and transmit the sequences 410A-410N to the discriminative predictor system 412. For example, the NLP preprocessing system 406 and the NLP risk control document model 408 can operate to segment the risk control document 402 into the sequences 410A-410N. The sequences 410A-410N can include, for example, feature-specific sequences (e.g., segmented from the risk control document 402) that may be substantially equivalent to text but include risk control feature and grammatical information.

The discriminative predictor system 412 can be configured to receive the sequences 410A-410N and the output of the risk control generative ML model 404 as inputs and generate a feature-relevant phrase 414 and a risk-control-relevant organizational entity 416 based on the inputs. The discriminative predictor system 412 can be configured to utilize the entire context of the current risk control document 402, including these sequences 410A-410N.

In several embodiments (not depicted in FIG. 4 for brevity), the risk control document composition system 400 can be configured to provide the suggestions wherever they are requested, such as in a user interface, wherever the user's cursor is positioned. The risk control document composition system 400 can be configured to suggest phrases or entities anywhere in the risk control document 402, such as in the beginning, the middle, or the end of the risk control document 402. In several embodiments, the risk control document composition system 400 can be bidirectional (e.g., the risk control document composition system 400 can be configured to look both backward and forward).

Figure 5:
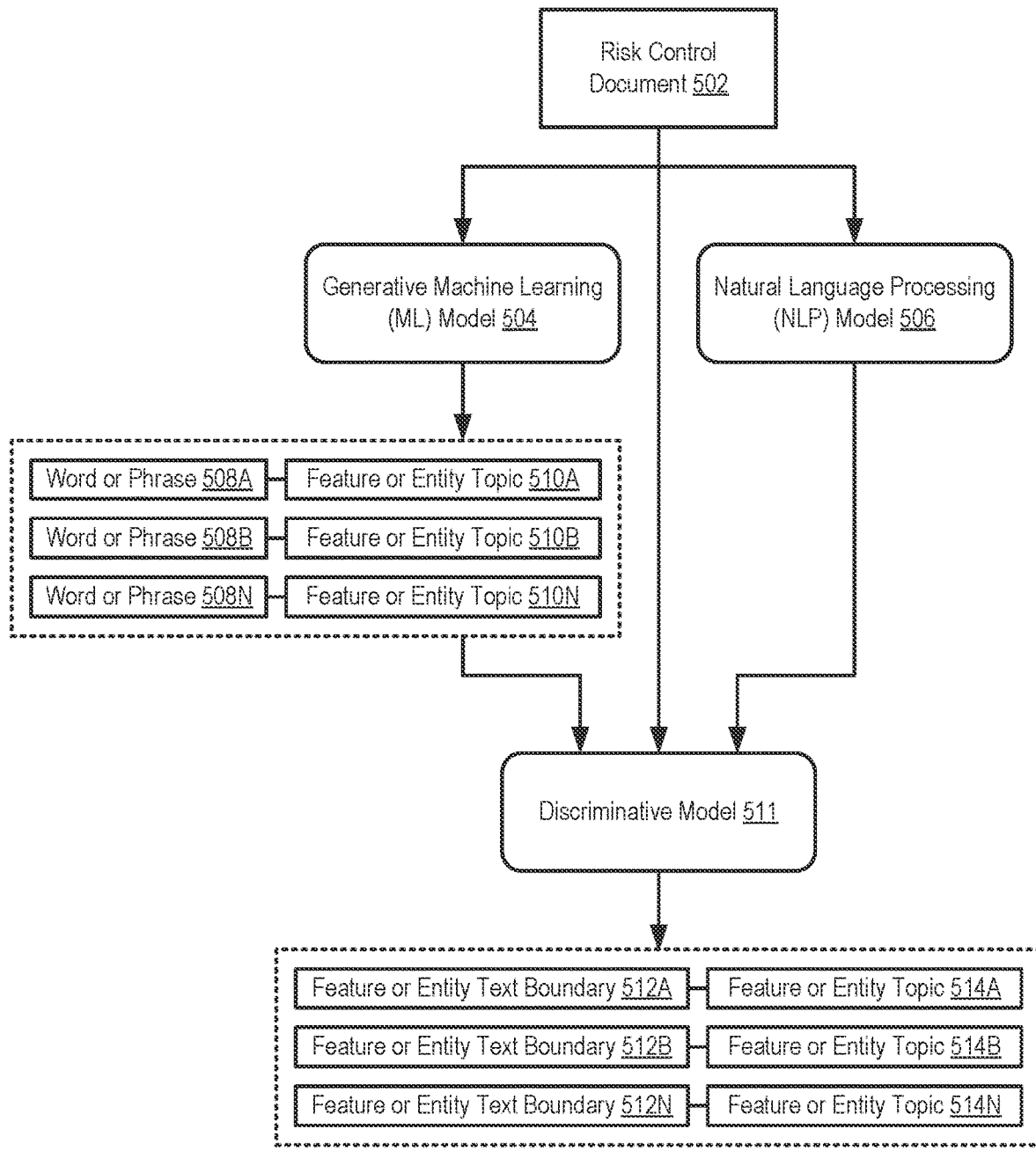
FIG. 5 is a schematic illustration of another example risk control document composition system according to some embodiments.

FIG. 5 is a block diagram of a risk control document composition system 500 that utilizes a discriminative model 511 for identifying and demarcating the original words or phrases that correspond to significant risk control features or entities in a risk control document 502, according to some embodiments. In several embodiments, the risk control document composition system 500 may be an extended configuration of the risk control document composition system 130 and the risk control database 140 described with reference to FIGS. 1A and 1B. As shown in FIG. 5, the risk control document composition system 500 can include a generative ML model 504, an NLP model 506, and the discriminative model 511. In several embodiments, the discriminative model 511 can be configured to receive two inputs as described below.

The first input to the discriminative model 511 may be, for example, the output from the generative ML model 504, which may be a generative ML model specialized for risk control documents. The generative ML model 504 can be configured to perform risk control feature detection and identification by transforming the input risk control document 502 into sequences of words or phrases 508A-508N paired with predicted risk control features or entity topics 510A-510N relevant to risk controls. The generative ML model 504 can be configured to produce words for features by outputting sequences representing the features detected in the input text. For example, when the risk control document 502 contains a phrase written in the passive voice, the generative ML model 504 can be configured to rephrase that phrase in the active voice. With reference to the risk control document composition system 500, the term "predicted" implies that the model is performing some classification (e.g., discriminative, not generative). Further, there are two operations in the model: (1) generating phrases based on the input risk control document 502 (these may exhibit latent features); and (2) classifying features based on the generated phrases.

The second input to the discriminative model 511 may be, for example, the encoded output from the NLP model that identifies parts of speech and other syntactic characteristics of words and phrases in the risk control document 502 to facilitate feature segmentation.

The discriminative model 511 can be configured to combine the outputs from the generative ML model 504 and the NLP model 506 into a single model that relates: (i) feature or entity topic classification of risk control words and phrases in the generative ML model 504; and (ii) grammatical classification of each word and phrase from the NLP model 506.

The discriminative model 511 can be trained, through supervised and unsupervised methods, with NLP rules that recognize special risk control grammatical expressions. The discriminative model 511 may apply these rules to the feature or entity topic classifications and grammatical classifications to target the words and phrases in the original risk control document 502.

The discriminative model 511 can be configured to identify relevant risk control features in the risk control document 502, such as: (i) why (e.g., the reason for this risk control; the risk being mitigated); (ii) who (e.g., the organizational entity responsible); (iii) when (e.g., the timing of the risk control); and (iv) how (e.g., risk control actions taken to effectuate the risk control). The discriminative model 511 can be further configured to identify entities in the risk control document 502, such as organizational units, dates, or times. The discriminative model 511 can be further configured to demarcate the words or phrases that correspond to the identified features or entities in the original document text of the risk control document 502.

In several embodiments, the risk control document composition system 500 can be configured to transmit a risk control document 502 to the generative ML model 504 and the NLP model 506. The generative ML model 504 can be configured to receive the risk control document 502 as input and generate words or phrases 508A-508N and predicted features or entity topics 510A-510N based on the risk control document 502, where word or phrase 508A is paired or otherwise associated with predicted feature or entity topic 510A, word or phrase 508B is paired or otherwise associated with predicted feature or entity topic 510B, and word or phrase 508N is paired or otherwise associated with predicted feature or entity topic 510N. The generative ML model 504 can be configured to transmit the words or phrases 508A-508N and the predicted features or entity topics 510A-510N to the discriminative model 511.

The NLP model 506 can be configured to receive the risk control document 502 as input, process the risk control document 502, and transmit its output to the discriminative model 511.

The discriminative model 511 can be configured to receive the words or phrases 508A-508N, the predicted features or entity topics 510A-510N, and the output of the NLP model 506 as inputs and generate feature or entity text boundaries 512A-512N and features or entity topics 514A-514N based on the inputs, where feature or entity text boundary 512A is paired or otherwise associated with feature or entity topic 514A, feature or entity text boundary 512B is paired or otherwise associated with feature or entity topic 514B, and feature or entity text boundary 512N is paired or otherwise associated with feature or entity topic 514N.

There are many exemplary aspects to this discriminative model described with reference to FIG. 5. For example, this discriminative model may be trained with smaller training sets since it: (i) allows for supervised as well as unsupervised training; and (ii) combines both generative and NLP pre-trained model systems so it can leverage transfer learning from two separate systems. In another example, this discriminative model is robust to grammatical variation due to the incorporation of feature and entity classification from the generative ML model 504.

Figure 6:
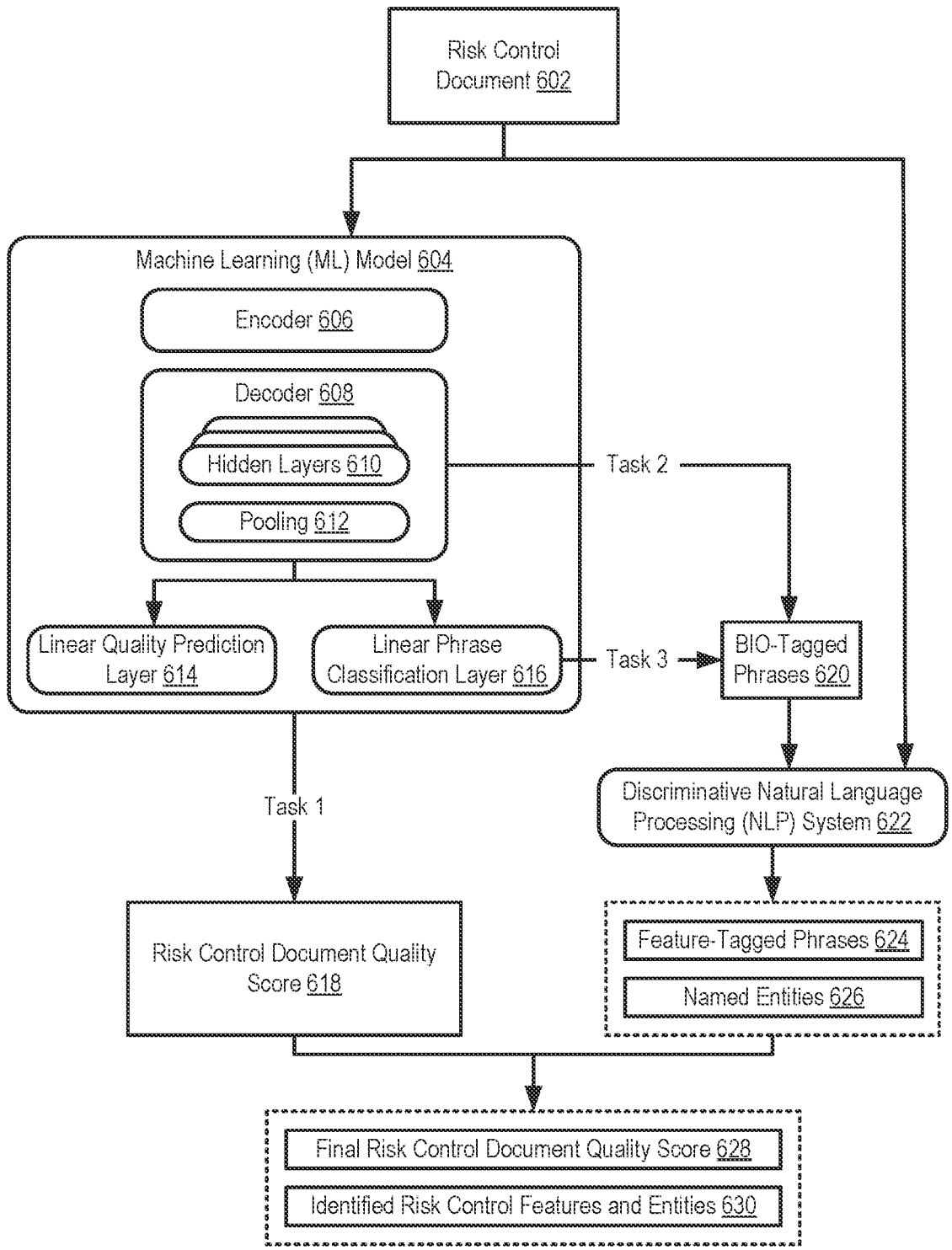
FIG. 6 is a schematic illustration of another example risk control document composition system according to some embodiments.

FIG. 6 is a block diagram of a risk control document composition system 600 for predicting quality and identifying features and entities of risk controls, according to some embodiments. In several embodiments, the risk control document composition system 600 may be an extended configuration of the risk control document composition system 130 and the risk control database 140 described with reference to FIGS. 1A and 1B. As shown in FIG. 6, the risk control document composition system 600 can include an ML model 604 and a discriminative NLP system 622.

The ML model 604 can include, for example, an ML model for semantic prediction, such as a generative language model using an attention-based transformer neural network architecture. For example, the ML model 604 can include an encoder 606, a decoder 608 (including hidden layers 610 and pooling 612), a linear quality prediction layer 614, and a linear phrase classification layer 616.

The discriminative NLP system 622 can include, for example, a discriminative NLP model and system for syntactic feature detection, entity recognition, and labeling, such as a combination NLP model with embedded rules for identifying features of and entities in risk control documents.

In several embodiments, the risk control document composition system 600 can be configured to transmit a risk control document 602 to the ML model 604, which can receive the risk control document 602 as input. The risk control document 602 can include, for example, plain text with a median length of between about 100 words and about 1,000 words. The risk control document composition system 600 can be configured to process the risk control document 602 through the ML model 604. For example, the risk control document composition system 600 can be configured to tokenize the risk control document 602 for the ML model 604 and then evaluate the risk control document 602 using the ML model 604.

The ML model 604 can be specialized as a multi-task system where separate task-specific layers share the same base model architecture. For example, the ML model 604 is specialized for three tasks:

Task 1: estimate document quality; generate a risk control document quality score 618. Accordingly, the risk control document quality score 618 is estimated directly by the ML model 704 in Task 1.

Task 2: regenerate phrases in the risk control document 602; the result may be a rewording of the original text, as filtered through the ML model 604.

Task 3: classify the feature topics of the phrases; generate Beginning-Inside-Outside (BIO)-tagged phrases 620, which in several embodiments can also include Inside-Outside-Beginning (IOB)-tagged phrases.

Task 2 and Task 3 can be paired multi-task operations. For example, the output from Task 3 can add BIO tags (which in several embodiments can also include IOB tags) aligned with each token generated by Task 2 with a suffix indicating the predicted topic, such as "B-HOW" for the feature "How." In short, the output of Task 1 is a prediction of document quality, the outputs of Task 2 are regenerated phrases from the final hidden layer in the decoder 608 of the ML Model 604, and the outputs of Task 3 are phrase classifications in BIO format. The risk control document composition system 600 can join the outputs from Task 2 and Task 3 together as BIO-tagged phrases 620 before presenting those outputs to the discriminative NLP system 622.

The risk control document composition system 600 can be configured to process the risk control document 602 through the discriminative NLP system 622. The discriminative NLP system 622 may have two inputs: (i) the original risk control document 602; and (ii) the output from the ML model 604 Task 2 and Task 3 (e.g., the BIO-tagged phrases 620).

The risk control document composition system 600 can be configured to use the discriminative NLP system 622 to tokenize and process the risk control document 602 based on the BIO-tagged phrases 620. The discriminative NLP system 622 can be configured to output a linguistic model of the risk control document 602 with tags for part of speech, grammatical dependency, and identified named entities including dates and times. The discriminative NLP system 622 can be further configured to apply phrase-matching rules to identify the non-overlapping phrases in the risk control document 602. Accordingly, the discriminative NLP system 622 can be configured to output feature-tagged phrases 624 and named entities 626.

The risk control document composition system 600 can be configured to use the discriminative NLP system 622 to tokenize and process the output from the ML model 604 Task 2 and Task 3 (e.g., the BIO-tagged phrases 620). This output may be similar to the risk control document 602 but the discriminative NLP system 622 can capture the phrase spans and feature topics from the BIO tags (or however the topics are communicated).

The discriminative NLP system 622 can include pattern rules to match the phrase spans from the ML model 604 output to phrase spans in the original risk control document 602. These rules may be simple and fuzzy, such as finding matching verbs in each phrase and working through the subject and object. More advanced matching algorithms may also be employed. For example, if the discriminative NLP system 622 cannot find a match, the discriminative NLP system 622 can skip the phrase. If the discriminative NLP system 622 finds a match, the discriminative NLP system 622 can tag the span in the original risk control document 602 with the topic identified by the ML model 604 Task 3.

The discriminative NLP system 622 can check the risk control document 602 for correct usage, such as named entities and for missing feature topics. For example, in several embodiments, risk control documents must contain Who, When, What, Why, and How. If the risk control document 602 has incorrect usage or is missing a feature, the discriminative NLP system 622 may optionally output these as "problems."

The risk control document composition system 600 can be configured to generate two outputs based on the risk control document quality score 618, the feature-tagged phrases 624, and the named entities 626: (i) a final risk control document quality score 628; and (ii) identified risk control features and entities 630, which may be a list of phrase spans with tags for the features they represent: Who, When, What, Why, or How.

Figure 7:
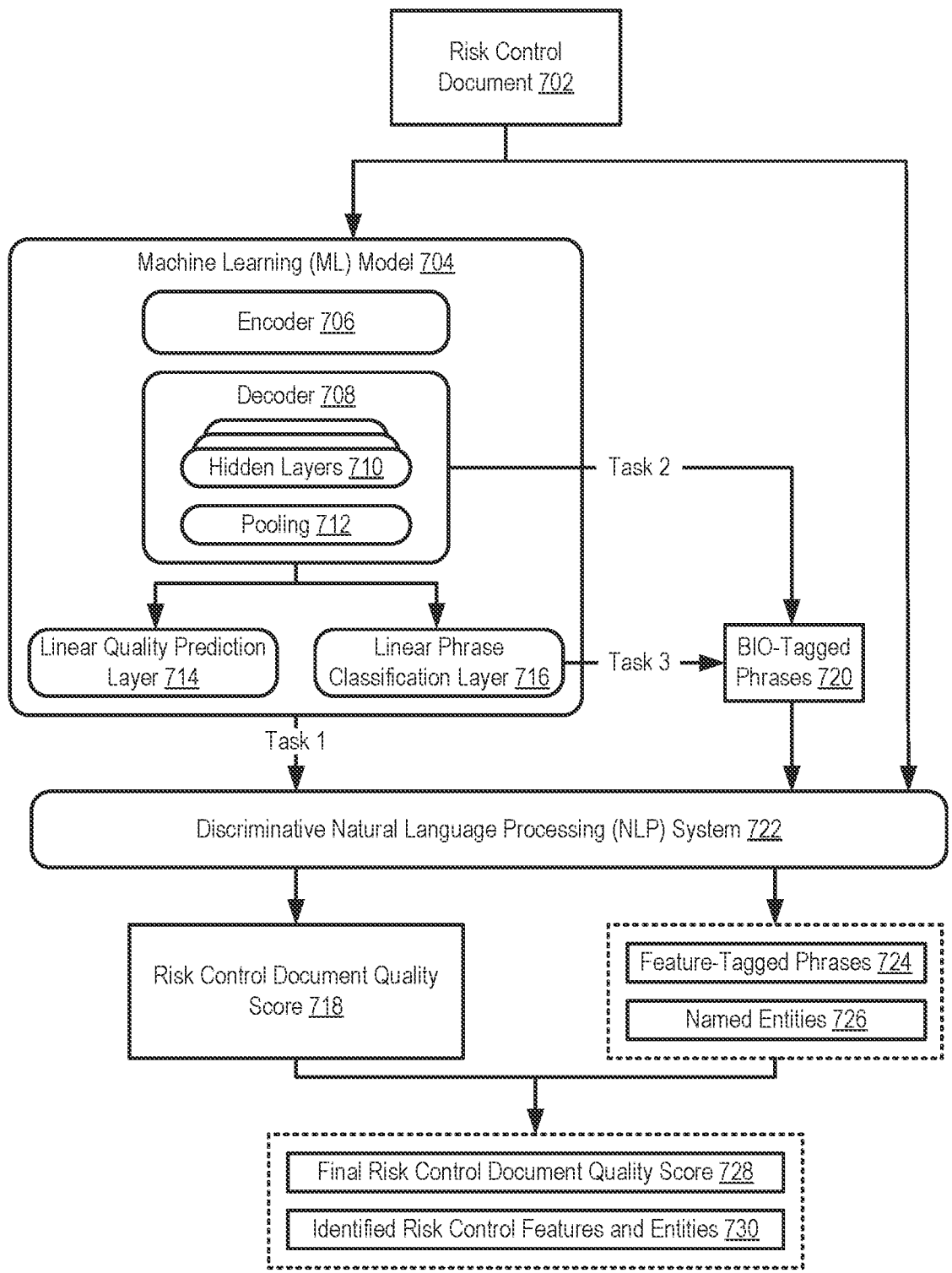
FIG. 7 is a schematic illustration of another example risk control document composition system according to some embodiments.

FIG. 7 is a block diagram of a risk control document composition system 700 for predicting quality and identifying features and entities of risk controls, according to some embodiments. In several embodiments, the risk control document composition system 700 may be an extended configuration of the risk control document composition system 130 and the risk control database 140 described with reference to FIGS. 1A and 1B. As shown in FIG. 7, the risk control document composition system 700 can include an ML model 704 and a discriminative NLP system 722.

The ML model 704 can include, for example, an ML model for semantic prediction, such as a generative language model using an attention-based transformer neural network architecture. For example, the ML model 704 can include an encoder 706, a decoder 708 (including hidden layers 710 and pooling 712), a linear quality prediction layer 714, and a linear phrase classification layer 716.

The discriminative NLP system 722 can include, for example, a discriminative NLP model and system for syntactic feature detection, entity recognition, and labeling, such as a combination NLP model with embedded rules for identifying features of and entities in risk control documents.

In several embodiments, the risk control document composition system 700 can be configured to transmit a risk control document 702 to the ML model 704, which can receive the risk control document 702 as input. The risk control document composition system 700 can be configured to process the risk control document 702 through the ML model 704. For example, the risk control document composition system 700 can be configured to tokenize the risk control document 702 for the ML model 704 and then evaluate the risk control document 702 using the ML model 704.

The ML model 704 can be specialized as a multi-task system where separate task-specific layers share the same base model architecture. For example, the ML model 704 is specialized for three tasks:

Task 1: estimate document quality.

Task 2: regenerate phrases in the risk control document 702; the result may be a rewording of the original text, as filtered through the ML model 704.

Task 3: classify the feature topics of the phrases; generate BIO-tagged phrases 720.

Task 2 and Task 3 can be paired multi-task operations. For example, the output from Task 3 can add BIO tags aligned with each token generated by Task 2 with a suffix indicating the predicted topic, such as "B-WHO" for the feature "WHO." In short, the output of Task 1 is a prediction of document quality, the outputs of Task 2 are regenerated phrases from the final hidden layer in the decoder 708 of the ML Model 704, and the outputs of Task 3 are phrase classifications in BIO format. The risk control document composition system 700 can join the outputs from Task 2 and Task 3 together as BIO-tagged phrases 720 before presenting those outputs to the discriminative NLP system 722.

The risk control document composition system 700 can be configured to process the risk control document 702 and the outputs of Task 1, Task 2, and Task 3 through the discriminative NLP system 722. The discriminative NLP system 722 may have three inputs: (i) the original risk control document 702; (ii) the output from the ML model 704 Task 1 (e.g., the prediction of document quality); and (iii) the output from the ML model 704 Task 2 and Task 3 (e.g., the BIO-tagged phrases 720).

The risk control document composition system 700 can be configured to use the discriminative NLP system 722 to generate a risk control document quality score 718 based on the three inputs. Accordingly, the risk control document quality score 718 is estimated by the ML model 704 in Task 1 and adjusted through findings in the discriminative NLP system 722.

The risk control document composition system 700 can be further configured to use the discriminative NLP system 722 to tokenize and process the risk control document 702 based on the BIO-tagged phrases 720. The discriminative NLP system 722 can be configured to output a linguistic model of the risk control document 702 with tags for part of speech, grammatical dependency, and identified named entities including dates and times. The discriminative NLP system 722 can be further configured to apply phrase-matching rules to identify the non-overlapping phrases in the risk control document 702. Accordingly, the discriminative NLP system 722 can be configured to output feature-tagged phrases 724 and named entities 726.

The risk control document composition system 700 can be configured to use the discriminative NLP system 722 to tokenize and process the output from the ML model 704 Task 2 and Task 3 (e.g., the BIO-tagged phrases 720). This output may be similar to the risk control document 702 but the discriminative NLP system 722 can capture the phrase spans and feature topics from the BIO tags (or however the topics are communicated).

The discriminative NLP system 722 can include pattern rules to match the phrase spans from the ML model 704 output to phrase spans in the original risk control document 702. These rules may be simple and fuzzy, such as finding matching verbs in each phrase and working through the subject and object. More advanced matching algorithms may also be employed. For example, if the discriminative NLP system 722 cannot find a match, the discriminative NLP system 722 can skip the phrase. If the discriminative NLP system 722 finds a match, the discriminative NLP system 722 can tag the span in the original risk control document 702 with the topic identified by the ML model 704 Task 3.

The discriminative NLP system 722 can check the risk control document 702 for correct usage, such as named entities and for missing feature topics. For example, in several embodiments, risk control documents must contain Who, When, What, Why, and How. If the risk control document 702 has incorrect usage or is missing a feature, the discriminative NLP system 722 may output these as "problems."

The risk control document composition system 700 can be configured to generate two outputs based on the risk control document quality score 718, the feature-tagged phrases 724, and the named entities 726: (i) a final risk control document quality score 728; and (ii) identified risk control features and entities 730, which may be a list of phrase spans with tags for the features they represent: Who, When, What, Why, or How.

Figure 8:
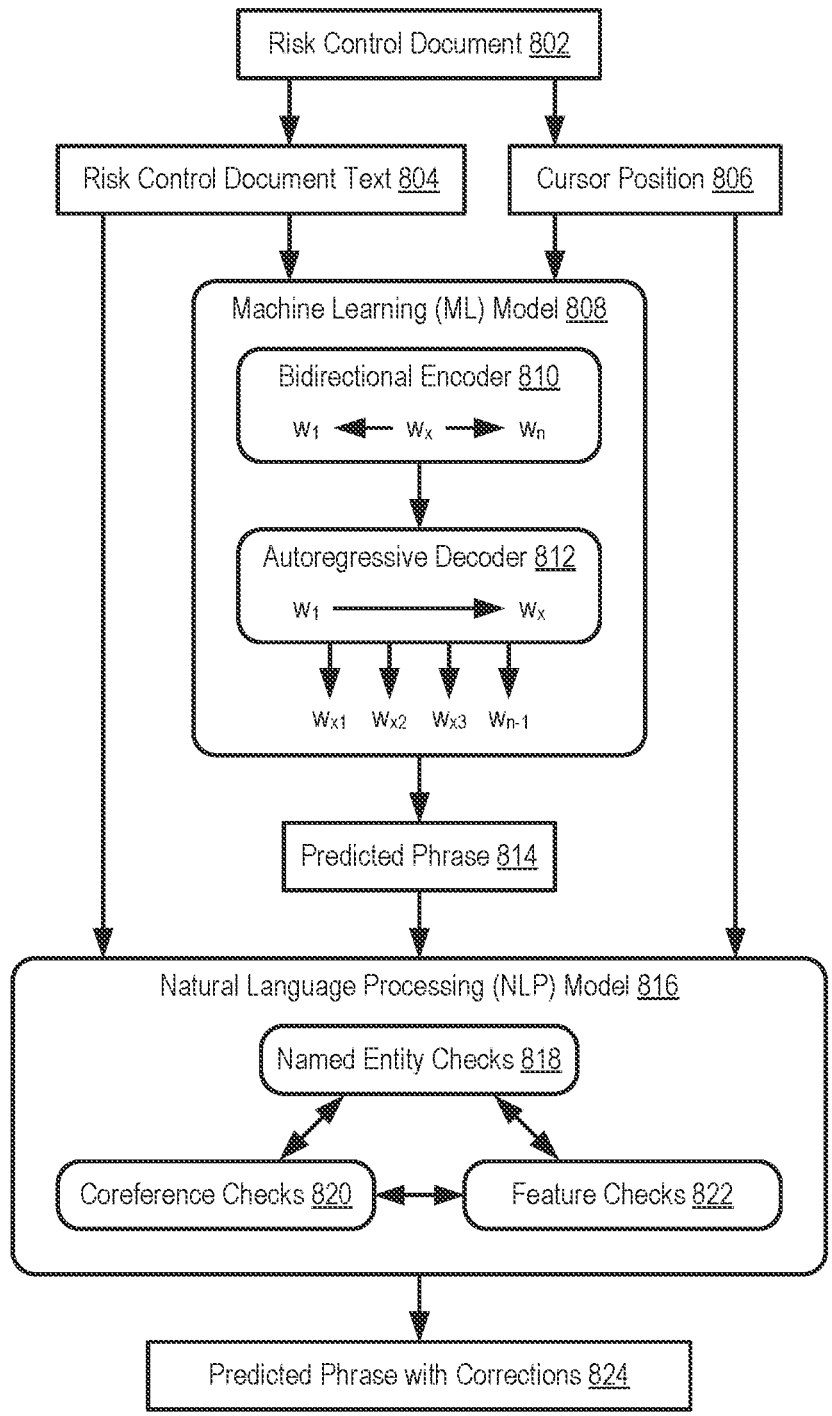
FIG. 8 is a schematic illustration of another example risk control document composition system according to some embodiments.

FIG. 8 is a block diagram of a risk control document composition system 800 for suggesting words, phrases, or entities to complete sequences in risk control documents, according to some embodiments. In several embodiments, the risk control document composition system 800 may be an extended configuration of the risk control document composition system 130 and the risk control database 140 described with reference to FIGS. 1A and 1B. As shown in FIG. 8, the risk control document composition system 800 can include an ML model 808 and an NLP model 816.

The ML model 808 can include, for example, an ML model for semantic prediction, such as a generative language model using an attention-based transformer neural network architecture. For example, the ML model 808 can include a bidirectional encoder 810 and an autoregressive decoder 812.

The NLP model 816 can include, for example, a discriminative NLP model and system for syntactic feature detection, entity recognition, and labeling, such as a system for performing named entity checks 818, a system for performing coreference checks 820, and a system for performing feature checks 822.

In several embodiments, the risk control document composition system 800 can be configured to process a risk control document 802 to generate risk control document text 804 and a cursor position 806 (e.g., a character or word position) showing where to start predicting text. The risk control document composition system 800 can be configured to transmit the risk control document text 804 and the cursor position 806 to the ML model 808, which can receive the risk control document text 804 and the cursor position 806 as input. The risk control document composition system 800 can be configured to process the risk control document text 804 and the cursor position 806 through the ML model 808. For example, the risk control document composition system 800 can be configured to tokenize the risk control document text 804 for the ML model 808 and convert the cursor position 806 into the method for communicating to the ML model 808 where to start generating text, such as a special start token. The risk control document composition system 800 can be configured to evaluate the risk control document text 804 using the ML model 808. The ML model 808 can be configured to output a predicted phrase 814. For example, the ML model 808 may predict its own stopping point, which may be a full named entity or the end of a phrase or sentence, and indicate that stopping point with a special stop token.

The risk control document composition system 800 can be configured to transmit the risk control document text 804, the cursor position 806, and the predicted phrase 814 to the NLP model 816, which can receive the risk control document text 804, the cursor position 806, and the predicted phrase 814 as input. The risk control document composition system 800 can be configured to process the risk control document text 804, the cursor position 806, and the predicted phrase 814 through the NLP model 816. For example, the NLP model 816 can be configured to match named entities in the suggested phrase (e.g., the predicted phrase 814) and correct them for usage and coreference as needed or desired, such as replacing the full name with a defined abbreviation, if given previously in the same document. In several embodiments, matching named entities can be part of the NLP model 816 training. The NLP model 816 can be configured to output a predicted phrase with corrections 824, which may correspond to the predicted phrase 814 output by the ML model 808 as corrected by the NLP model 816.

Methods of Operation

Figure 9:
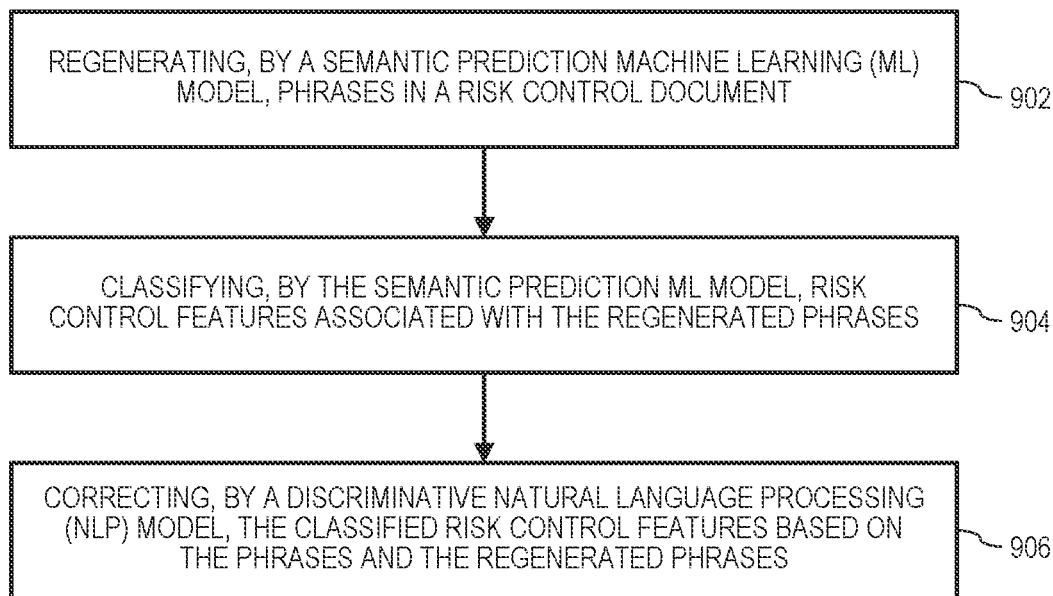
FIG. 9 is an example process flow for automatically identifying risk control features and entities in a risk control document according to some embodiments.

FIG. 9 shows a method 900 of operating the system 100 (e.g., risk control document composition system 130), risk control document composition system 200, risk control document composition system 300, risk control document composition system 400, risk control document composition system 500, risk control document composition system 600, risk control document composition system 700, risk control document composition system 800, architecture 1200, or a combination thereof, to provide for automatically identifying risk control features and entities in a risk control document according to some embodiments. In several embodiments, the operations of method 900 can be performed, for example, by the functional units or devices described with reference to the system 100, risk control document composition system 200, risk control document composition system 300, risk control document composition system 400, risk control document composition system 500, risk control document composition system 600, risk control document composition system 700, risk control document composition system 800, architecture 1200, or a combination thereof. For the sake of brevity (and not limitation), the operations of method 900 shall be described with reference to the system 100 shown in FIGS. 1A and 1B. For example, the operations of method 900 can be performed by the risk control document composition system 130 shown in FIG. 1A. However, the operations of method 900 are not limited to those example embodiments and may be performed by any other suitable component or structure or any combination thereof.

In several embodiments, in operation 902, the risk control document composition system 130 regenerates, by a semantic prediction ML model (e.g., implemented using the ML system 132), phrases 180 in a risk control document 142. The semantic prediction ML model can include, for example, an attention-based transformer neural network that includes neural network layers specialized for risk control documents. In several embodiments, the semantic prediction ML model can be trained, for example, by a process that includes: (i) receiving, by the semantic prediction ML model, a corpus of risk control documents; (ii) generating, by the semantic prediction ML model for each risk control document 142 in the corpus of risk control documents, a modified risk control document 158 by performing modification operations on the respective risk control document 142 including, but not limited to, replacing words with synonyms of the words, inserting punctuation, removing punctuation, changing sentences from active voice to passive voice, changing sentences from passive voice to active voice, or a combination thereof; (iii) masking, by the semantic prediction ML model, phrases in each modified risk control document 158; (iv) regenerating, by the semantic prediction ML model, the masked phrases in each modified risk control document 158; (v) classifying, by the semantic prediction ML model, the risk control features 146 associated with the regenerated masked phrases to generate classified risk control features 148; (vi) matching, by the discriminative NLP model, the regenerated masked phrases with corresponding phrases in the corpus of risk control documents 142; and (vii) determining, by the discriminative NLP model, whether each of the classified risk control features 148 is correct based on the matched regenerated masked phrases. In several embodiments, the regeneration of the phrases in the risk control document 142 can be accomplished using suitable computing, electrical, or other methods and include regenerating the phrases in the risk control document 142 in accordance with any aspect or combination of aspects described with reference to FIGS. 1-8 above and FIGS. 10-12 below.

In several embodiments, in operation 904, the risk control document composition system 130 classifies, by the semantic prediction ML model, risk control features 146 associated with the regenerated phrases in the risk control document 142. The risk control features 146 can include, but are not limited to, for example: (i) a first risk control feature indicative of a risk control entity 152 responsible for performing a risk control action 144 identified in the risk control document 142; (ii) a second risk control feature indicative of when the risk control action 144 is to be performed; (iii) a third risk control feature indicative of a description (e.g., a textual description) of the risk control action 144; (iv) a fourth risk control feature indicative of a reason for the risk control action 144; and (v) a fifth risk control feature indicative of how a risk is mitigated by a performance of the risk control action 144. In several embodiments, the classification of the risk control features 146 can be accomplished using suitable computing, electrical, or other methods and include classifying the risk control features 146 in accordance with any aspect or combination of aspects described with reference to FIGS. 1-8 above and FIGS. 10-12 below.

In several embodiments, in operation 906, the risk control document composition system 130 corrects, by a discriminative NLP model (e.g., implemented using the NLP system 134), one or more problems within the classified risk control features 148 based on the phrases and the regenerated phrases in the risk control document 142 to generate corrected classified risk control features 150. Those skilled in the art would understand that exemplary problems may include, but are not limited to, incorrect usage of features or entities, missing features or entities, etc. In several embodiments, the correction of the classified risk control features 148 can be accomplished using suitable computing, electrical, or other methods and include correcting the classified risk control features 148 in accordance with any aspect or combination of aspects described with reference to FIGS. 1-8 above and FIGS. 10-12 below.

Figure 10:
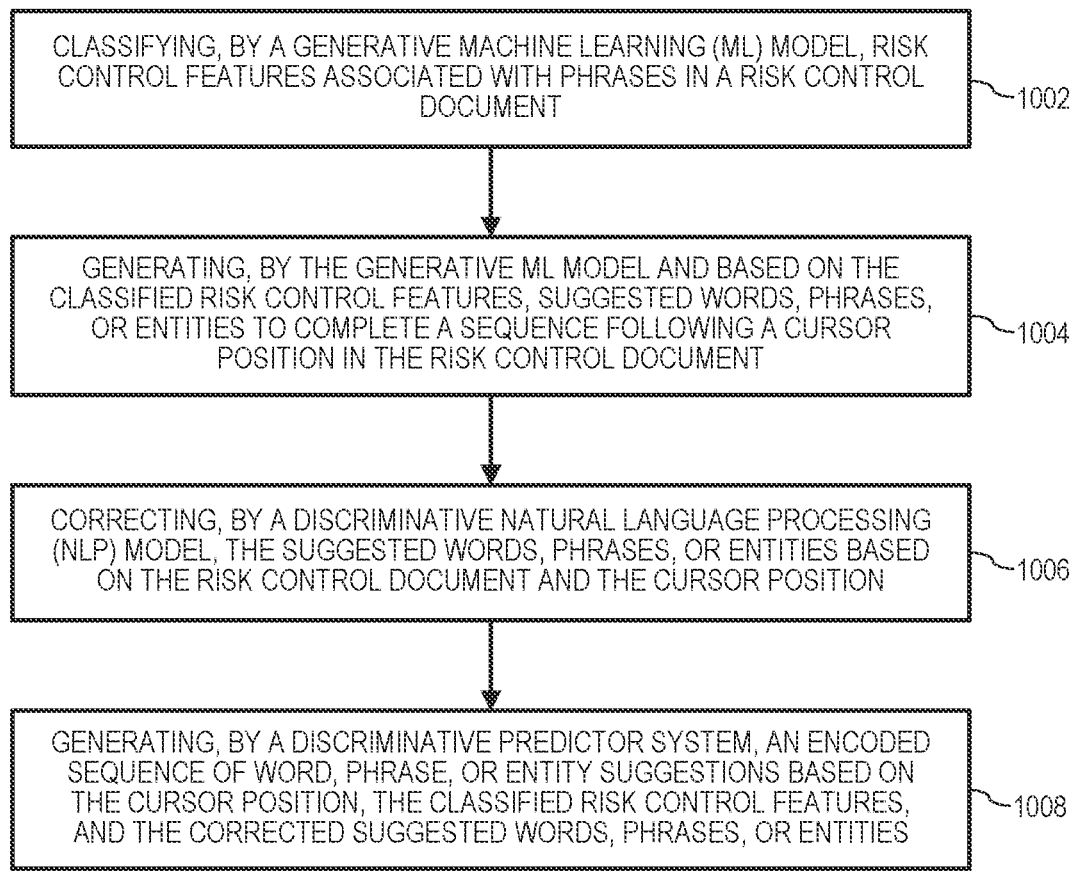
FIG. 10 is an example process flow for automatically suggesting a word, phrase, or entity to complete a sequence in a risk control document according to some embodiments.

FIG. 10 shows a method 1000 of operating the system 100 (e.g., risk control document composition system 130), risk control document composition system 200, risk control document composition system 300, risk control document composition system 400, risk control document composition system 500, risk control document composition system 600, risk control document composition system 700, risk control document composition system 800, architecture 1200, or a combination thereof, to provide for automatically suggesting a word, phrase, or entity to complete a sequence in a risk control document according to some embodiments. In several embodiments, the operations of method 1000 can be performed, for example, by the functional units or devices described with reference to the system 100, risk control document composition system 200, risk control document composition system 300, risk control document composition system 400, risk control document composition system 500, risk control document composition system 600, risk control document composition system 700, risk control document composition system 800, architecture 1200, or a combination thereof. For the sake of brevity (and not limitation), the operations of method 1000 shall be described with reference to the system 100 shown in FIGS. 1A and 1B. For example, the operations of method 1000 can be performed by the risk control document composition system 130 shown in FIG. 1A. However, the operations of method 1000 are not limited to those example embodiments and may be performed by any other suitable component or structure or any combination thereof.

In several embodiments, in operation 1002, the risk control document composition system 130 classifies, by a generative ML model (e.g., implemented using the ML system 132), risk control features 146 associated with phrases in a risk control document 142. The risk control features 146 can include, but are not limited to, for example: (i) a first risk control feature indicative of a risk control entity 152 responsible for performing a risk control action 144 identified in the risk control document 142; (ii) a second risk control feature indicative of when the risk control action 144 is to be performed; (iii) a third risk control feature indicative of a description (e.g., a textual description) of the risk control action 144; (iv) a fourth risk control feature indicative of a reason for the risk control action 144; and (v) a fifth risk control feature indicative of how a risk is mitigated by a performance of the risk control action 144. The generative ML model can include, for example, a bidirectional encoder and an autoregressive decoder. In several embodiments, the generative ML model can be trained, for example, by a process that includes: (i) receiving, by the generative ML model, a corpus of risk control documents; (ii) generating, by the generative ML model for each risk control document 142 in the corpus of risk control documents, a modified risk control document 158 by performing modification operations on the respective risk control document 142 including, but not limited to, replacing words with synonyms of the words, inserting punctuation, removing punctuation, changing sentences from active voice to passive voice, changing sentences from passive voice to active voice, or a combination thereof; (iii) masking, by the generative ML model, phrases in each modified risk control document 158; (iv) regenerating, by the generative ML model, the masked phrases in each modified risk control document 158; (v) classifying, by the generative ML model, the risk control features 146 associated with the regenerated masked phrases to generate classified risk control features 148; (vi) matching, by the discriminative NLP model, the regenerated masked phrases with corresponding phrases in the corpus of risk control documents 142; and (vii) determining, by the discriminative NLP model, whether each of the classified risk control features 148 is correct based on the matched regenerated masked phrases. In several embodiments, the classification of the risk control features 146 can be accomplished using suitable computing, electrical, or other methods and include classifying the risk control features 146 in accordance with any aspect or combination of aspects described with reference to FIGS. 1-9 above and FIGS. 11-12 below.

In several embodiments, in operation 1004, the risk control document composition system 130 generates, by the generative ML model and based on the classified risk control features 148, suggested words, phrases, or entities to complete a sequence following a cursor position in the risk control document 142. In one example, in operation 1004, the risk control document composition system 130 can generate, by the generative ML model and based on the classified risk control features 148, a suggested entity name to complete the sequence following the cursor position in the risk control document 142. In several embodiments, the generation of the suggested words, phrases, or entities can be accomplished using suitable computing, electrical, or other methods and include generating the suggested words, phrases, or entities in accordance with any aspect or combination of aspects described with reference to FIGS. 1-9 above and FIGS. 11-12.

In several embodiments, in operation 1006, the risk control document composition system 130 corrects, by a discriminative NLP model (e.g., implemented using the NLP system 134), the suggested words, phrases, or entities based on the risk control document 142 and the cursor position. In one example, following the example described above with reference to operation 1004, in operation 1006 the risk control document composition system 130 can: determine, by the generative ML model, whether the suggested entity name was used in the risk control document 142 prior to the cursor position; and correct, by the discriminative NLP model, the suggested entity name in response to determining that the suggested entity name was used in the risk control document 142 prior to the cursor position, where the corrected suggested entity name includes an abbreviation for the suggested entity name. In several embodiments, the correction of the suggested words, phrases, or entities can be accomplished using suitable computing, electrical, or other methods and include correcting the suggested words, phrases, or entities in accordance with any aspect or combination of aspects described with reference to FIGS. 1-9 above and FIGS. 11-12.

In several embodiments, in operation 1008, the risk control document composition system 130 generates, by a discriminative predictor system 136, an encoded sequence of word, phrase, or entity suggestions based on the cursor position, the classified risk control features 148, and the corrected suggested words, phrases, or entities. In several embodiments, the generation of the encoded sequence of word, phrase, or entity suggestions can be accomplished using suitable computing, electrical, or other methods and include generating the encoded sequence of word, phrase, or entity suggestions in accordance with any aspect or combination of aspects described with reference to FIGS. 1-9 above and FIGS. 11-12.

Figure 11:
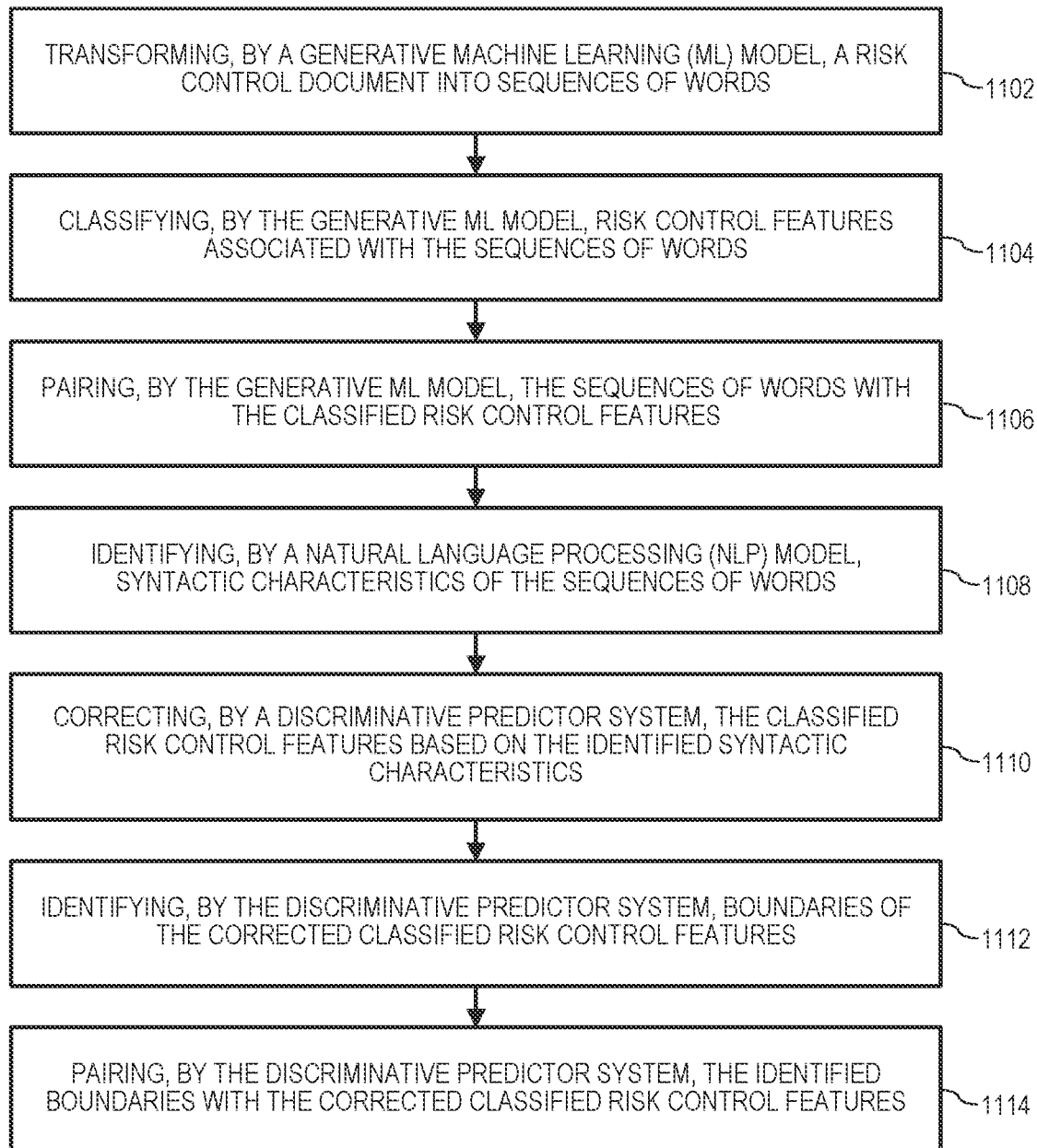
FIG. 11 is another example process flow for automatically identifying risk control features and entities in a risk control document according to some embodiments.

FIG. 11 shows a method 1100 of operating the system 100 (e.g., risk control document composition system 130), risk control document composition system 200, risk control document composition system 300, risk control document composition system 400, risk control document composition system 500, risk control document composition system 600, risk control document composition system 700, risk control document composition system 800, architecture 1200, or a combination thereof, to provide for automatically identifying risk control features and entities in a risk control document according to some embodiments. In several embodiments, the operations of method 1100 can be performed, for example, by the functional units or devices described with reference to the system 100, risk control document composition system 200, risk control document composition system 300, risk control document composition system 400, risk control document composition system 500, risk control document composition system 600, risk control document composition system 700, risk control document composition system 800, architecture 1200, or a combination thereof. For the sake of brevity (and not limitation), the operations of method 1100 shall be described with reference to the system 100 shown in FIGS. 1A and 1B. For example, the operations of method 1100 can be performed by the risk control document composition system 130 shown in FIG. 1A. However, the operations of method 1100 are not limited to those example embodiments and may be performed by any other suitable component or structure or any combination thereof.

In several embodiments, in operation 1102, the risk control document composition system 130 transforms, by a generative ML model (e.g., implemented using the ML system 132), a risk control document 142 into sequences of words. The generative ML model can include, for example, an attention-based transformer neural network that includes neural network layers specialized for risk control documents. The generative ML model can include, for example, a bidirectional encoder and an autoregressive decoder. In several embodiments, the generative ML model can be trained, for example, by a process that includes: (i) receiving, by the generative ML model, a corpus of risk control documents; (ii) generating, by the generative ML model for each risk control document 142 in the corpus of risk control documents, a modified risk control document 158 by performing modification operations on the respective risk control document 142 including, but not limited to, replacing words with synonyms of the words, inserting punctuation, removing punctuation, changing sentences from active voice to passive voice, changing sentences from passive voice to active voice, or a combination thereof; (iii) masking, by the generative ML model, phrases in each modified risk control document 158; (iv) regenerating, by the generative ML model, the masked phrases in each modified risk control document 158; (v) classifying, by the generative ML model, the risk control features 146 associated with the regenerated masked phrases to generate classified risk control features 148; (vi) matching, by the discriminative NLP model, the regenerated masked phrases with corresponding phrases in the corpus of risk control documents 142; and (vii) determining, by the discriminative NLP model, whether each of the classified risk control features 148 is correct based on the matched regenerated masked phrases. In several embodiments, the transformation of the risk control document 142 can be accomplished using suitable computing, electrical, or other methods and include transforming the risk control document 142 in accordance with any aspect or combination of aspects described with reference to FIGS. 1-10 above and FIG. 12 below.

In several embodiments, in operation 1104, the risk control document composition system 130 classifies, by the generative ML model, risk control features 146 associated with the sequences of words to generate classified risk control features 148. The risk control features 146 can include, but are not limited to, for example: (i) a first risk control feature indicative of a risk control entity 152 responsible for performing a risk control action 144 identified in the risk control document 142; (ii) a second risk control feature indicative of when the risk control action 144 is to be performed; (iii) a third risk control feature indicative of a description (e.g., a textual description) of the risk control action 144; (iv) a fourth risk control feature indicative of a reason for the risk control action 144; and (v) a fifth risk control feature indicative of how a risk is mitigated by a performance of the risk control action 144. In several embodiments, the classification of the risk control features 146 can be accomplished using suitable computing, electrical, or other methods and include classifying the risk control features 146 in accordance with any aspect or combination of aspects described with reference to FIGS. 1-10 above and FIG. 12 below.

In several embodiments, in operation 1106, the risk control document composition system 130 pairs, by the generative ML model, the sequences of words with the classified risk control features 148. In several embodiments, the pairing of the sequences of words with the classified risk control features 148 can be accomplished using suitable computing, electrical, or other methods and include pairing the sequences of words with the classified risk control features 148 in accordance with any aspect or combination of aspects described with reference to FIGS. 1-10 above and FIG. 12 below.

In several embodiments, in operation 1108, the risk control document composition system 130 identifies, by an NLP model (e.g., implemented using the NLP system 134), syntactic characteristics of the sequences of words. In several embodiments, the identification of the syntactic characteristics can be accomplished using suitable computing, electrical, or other methods and include identifying the syntactic characteristics in accordance with any aspect or combination of aspects described with reference to FIGS. 1-10 above and FIG. 12 below.

In several embodiments, in operation 1110, the risk control document composition system 130 corrects, by a discriminative predictor system 136, the classified risk control features 148 based on the identified syntactic characteristics to generate corrected classified risk control features 150. In several embodiments, the correction of the classified risk control features 148 can be accomplished using suitable computing, electrical, or other methods and include correcting the classified risk control features 148 in accordance with any aspect or combination of aspects described with reference to FIGS. 1-10 above and FIG. 12 below.

In several embodiments, in operation 1112, the risk control document composition system 130 identifies, by the discriminative predictor system 136, text boundaries of the corrected classified risk control features 150. In several embodiments, the identification of the text boundaries can be accomplished using suitable computing, electrical, or other methods and include identifying the text boundaries in accordance with any aspect or combination of aspects described with reference to FIGS. 1-10 above and FIG. 12 below.

In several embodiments, in operation 1114, the risk control document composition system 130 pairs, by the discriminative predictor system 136, the identified text boundaries with the corrected classified risk control features 150. In several embodiments, the pairing of the identified text boundaries with the corrected classified risk control features 150 can be accomplished using suitable computing, electrical, or other methods and include pairing the identified text boundaries with the corrected classified risk control features 150 in accordance with any aspect or combination of aspects described with reference to FIGS. 1-10 above and FIG. 12 below.

Components of the System

Figure 12:
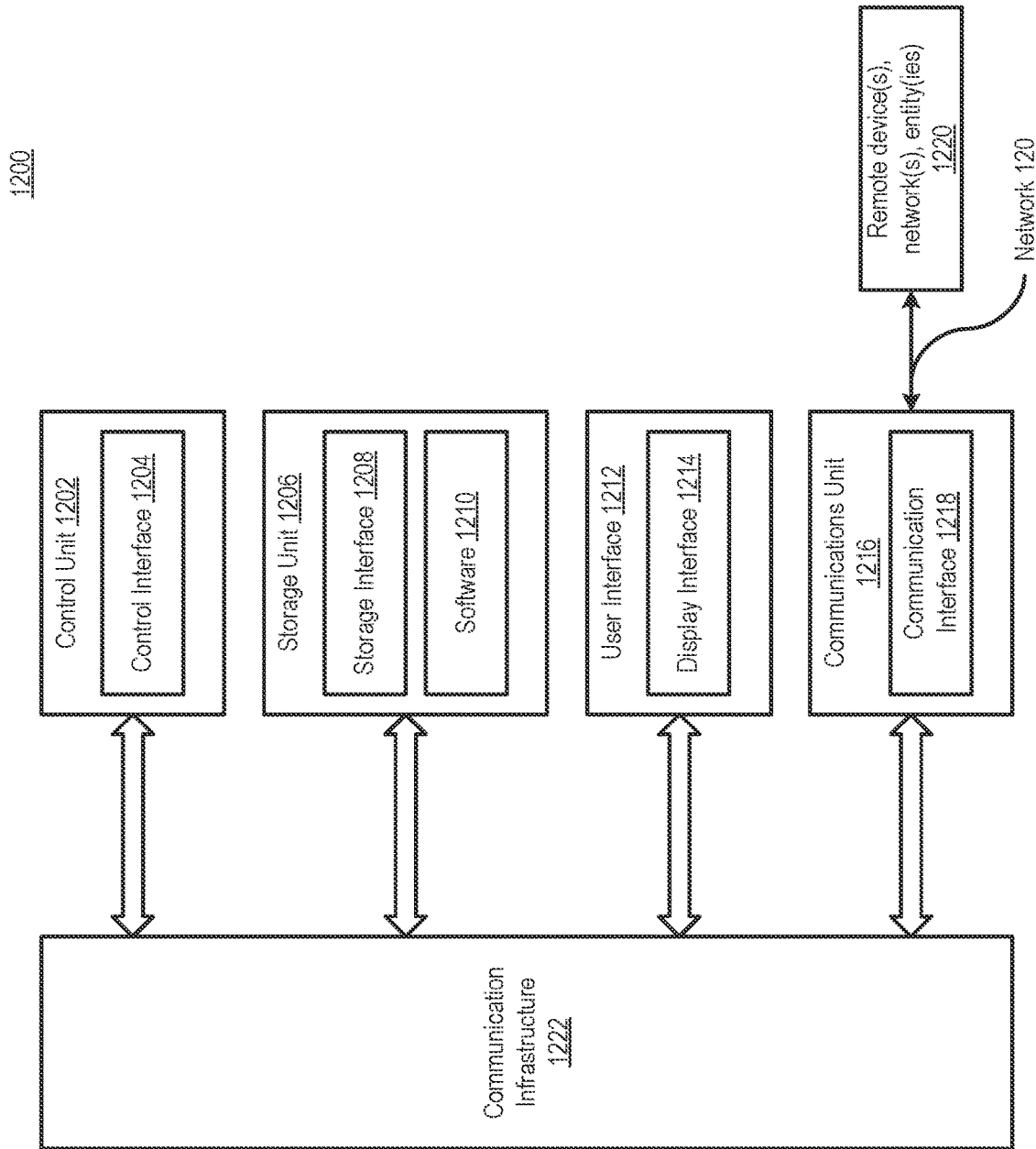
FIG. 12 is an example architecture of components implementing an example system for automatically identifying risk control features and entities in a risk control document, automatically suggesting a word, phrase, or entity to complete a sequence in a risk control document, or both, according to some embodiments.

FIG. 12 is an example architecture 1200 of components implementing the system 100, risk control document composition system 200, risk control document composition system 300, risk control document composition system 400, risk control document composition system 500, risk control document composition system 600, risk control document composition system 700, risk control document composition system 800, or a combination thereof, according to some embodiments. The components may be implemented by any of the devices described with reference to: the system 100, such as the client device 110, the client device 160, the risk control document composition system 130, or the risk control database 140; the risk control document composition system 200, such as the classification model 204, the training loss system 212, or the discriminative NLP system 216; the risk control document composition system 300, such as the general-purpose transformer-attention model 304, the neural network specialization layers 306, or the discriminative NLP system 310; the risk control document composition system 400, such as the risk control generative ML model 404, the NLP preprocessing system 406, the NLP risk control document model 408, or the discriminative predictor system 412; the risk control document composition system 500, such as the generative ML model 504, the NLP model 506, or the discriminative model 512; the risk control document composition system 600, such as the ML model 604 or the discriminative NLP system 622; the risk control document composition system 700, such as the ML model 704 or the discriminative NLP system 722; the risk control document composition system 800, such as the ML model 808 or the NLP model 816; any other device, component, or structure disclosed herein; or any combination thereof.

In several embodiments, the components may include a control unit 1202, a storage unit 1206, a communication unit 1216, and a user interface 1212. The control unit 1202 may include a control interface 1204. The control unit 1202 may execute a software 1210 to provide some or all of the machine intelligence described with reference to the system 100, risk control document composition system 200, risk control document composition system 300, risk control document composition system 400, risk control document composition system 500, risk control document composition system 600, risk control document composition system 700, risk control document composition system 800, architecture 1200, or a combination thereof.

The control unit 1202 may be implemented in a number of different ways. For example, the control unit 1202 may be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 1204 may be used for communication between the control unit 1202 and other functional units or devices of the system 100, risk control document composition system 200, risk control document composition system 300, risk control document composition system 400, risk control document composition system 500, risk control document composition system 600, risk control document composition system 700, risk control document composition system 800, architecture 1200, or a combination thereof. The control interface 1204 may also be used for communication that is external to the functional units or devices of the system 100, risk control document composition system 200, risk control document composition system 300, risk control document composition system 400, risk control document composition system 500, risk control document composition system 600, risk control document composition system 700, risk control document composition system 800, remote devices 1220, or a combination thereof. The control interface 1204 may receive information from, or transmit information to, the functional units or devices of the system 100, risk control document composition system 200, risk control document composition system 300, risk control document composition system 400, risk control document composition system 500, risk control document composition system 600, risk control document composition system 700, risk control document composition system 800, remote devices 1220, or a combination thereof. The remote devices 1220 refer to units or devices external to the system 100, risk control document composition system 200, risk control document composition system 300, risk control document composition system 400, risk control document composition system 500, risk control document composition system 600, risk control document composition system 700, or risk control document composition system 800.

The control interface 1204 may be implemented in different ways and may include different implementations depending on which functional units or devices of the system 100, risk control document composition system 200, risk control document composition system 300, risk control document composition system 400, risk control document composition system 500, risk control document composition system 600, risk control document composition system 700, risk control document composition system 800, or the remote devices 1220 are being interfaced with the control unit 1202. For example, the control interface 1204 may be implemented with a pressure sensor, an inertial sensor, a microelectromechanical system (MEMS), optical circuitry, waveguides, wireless circuitry, wireline circuitry to attach to a bus, an application programming interface (API), or a combination thereof. The control interface 1204 may be connected to a communication infrastructure 1222, such as a bus, to interface with the functional units or devices of the system 100, risk control document composition system 200, risk control document composition system 300, risk control document composition system 400, risk control document composition system 500, risk control document composition system 600, risk control document composition system 700, risk control document composition system 800, the remote devices 1220, or a combination thereof.

The storage unit 1206 may store the software 1210. For illustrative purposes, the storage unit 1206 is shown as a single element, although it is understood that the storage unit 1206 may be a distribution of storage elements. Also for illustrative purposes, the storage unit 1206 is shown as a single hierarchy storage system, although it is understood that the storage unit 1206 may be in a different configuration. For example, the storage unit 1206 may be formed with different storage technologies forming a memory hierarchical system including different levels of caching, main memory, rotating media, or off-line storage. The storage unit 1206 may be a volatile memory, a nonvolatile memory, an internal memory, an external memory, or a combination thereof. For example, the storage unit 1206 may be a nonvolatile storage such as nonvolatile random access memory (NVRAM), Flash memory, disk storage, or a volatile storage such as static random access memory (SRAM) or dynamic random access memory (DRAM).

The storage unit 1206 may include a storage interface 1208. The storage interface 1208 may be used for communication between the storage unit 1206 and other functional units or devices of the system 100, risk control document composition system 200, risk control document composition system 300, risk control document composition system 400, risk control document composition system 500, risk control document composition system 600, risk control document composition system 700, risk control document composition system 800, or a combination thereof. The storage interface 1208 may also be used for communication that is external to the system 100, risk control document composition system 200, risk control document composition system 300, risk control document composition system 400, risk control document composition system 500, risk control document composition system 600, risk control document composition system 700, risk control document composition system 800, or a combination thereof. The storage interface 1208 may receive information from, or transmit information to, the other functional units or devices of the system 100, risk control document composition system 200, risk control document composition system 300, risk control document composition system 400, risk control document composition system 500, risk control document composition system 600, risk control document composition system 700, risk control document composition system 800, the remote devices 1220, or a combination thereof. The storage interface 1208 may include different implementations depending on which functional units or devices of the system 100, risk control document composition system 200, risk control document composition system 300, risk control document composition system 400, risk control document composition system 500, risk control document composition system 600, risk control document composition system 700, risk control document composition system 800, or the remote devices 1220 are being interfaced with the storage unit 1206. The storage interface 1208 may be implemented with technologies and techniques similar to the implementation of the control interface 1204.

The communication unit 1216 may enable communication to devices, components, modules, or units of the system 100, risk control document composition system 200, risk control document composition system 300, risk control document composition system 400, risk control document composition system 500, risk control document composition system 600, risk control document composition system 700, risk control document composition system 800, the remote devices 1220, or a combination thereof. For example, the communication unit 1216 may permit the system 100 to communicate between the client device 110, the client device 160, the risk control document composition system 130, the risk control database 140, or a combination thereof. In another example, the communication unit 1216 may permit the risk control document composition system 200 to communicate between the classification model 204, the training loss system 212, the discriminative NLP system 216, or a combination thereof. The communication unit 1216 may further permit the devices of the system 100, risk control document composition system 200, risk control document composition system 300, risk control document composition system 400, risk control document composition system 500, risk control document composition system 600, risk control document composition system 700, risk control document composition system 800, or a combination thereof, to communicate with the remote devices 1220 such as an attachment, a peripheral device, or a combination thereof through the network 120.

As previously indicated, the network 120 may span and represent a variety of networks and network topologies. For example, the network 120 may include wireless communication, wired communication, optical communication, ultrasonic communication, or a combination thereof. For example, satellite communication, cellular communication, Bluetooth, Infrared Data Association standard (IrDA), wireless fidelity (Wi-Fi), and worldwide interoperability for microwave access (WiMAX) are examples of wireless communication that may be included in the network 120. Cable, Ethernet, digital subscriber line (DSL), fiber optic lines, fiber to the home (FTTH), and plain old telephone service (POTS) are examples of wired communication that may be included in the network 120. Further, the network 120 may traverse a number of network topologies and distances. For example, the network 120 may include direct connection, personal area network (PAN), local area network (LAN), metropolitan area network (MAN), wide area network (WAN), or a combination thereof.

The communication unit 1216 may also function as a communication hub allowing the system 100, risk control document composition system 200, risk control document composition system 300, risk control document composition system 400, risk control document composition system 500, risk control document composition system 600, risk control document composition system 700, risk control document composition system 800, or a combination thereof, to function as part of the network 120 and not be limited to be an end point or terminal unit to the network 120. The communication unit 1216 may include active and passive components, such as microelectronics or an antenna, for interaction with the network 120.

The communication unit 1216 may include a communication interface 1218. The communication interface 1218 may be used for communication between the communication unit 1216 and other functional units or devices of the system 100, risk control document composition system 200, risk control document composition system 300, risk control document composition system 400, risk control document composition system 500, risk control document composition system 600, risk control document composition system 700, risk control document composition system 800, the remote devices 1220, or a combination thereof. The communication interface 1218 may receive information from, or transmit information to, the other functional units or devices of the system 100, risk control document composition system 200, risk control document composition system 300, risk control document composition system 400, risk control document composition system 500, risk control document composition system 600, risk control document composition system 700, risk control document composition system 800, the remote devices 1220, or a combination thereof. The communication interface 1218 may include different implementations depending on which functional units or devices are being interfaced with the communication unit 1216. The communication interface 1218 may be implemented with technologies and techniques similar to the implementation of the control interface 1204.

The user interface 1212 may present information generated by the system 100, risk control document composition system 200, risk control document composition system 300, risk control document composition system 400, risk control document composition system 500, risk control document composition system 600, risk control document composition system 700, risk control document composition system 800, or a combination thereof. In several embodiments, the user interface 1212 allows a user to interface with the devices of the system 100, risk control document composition system 200, risk control document composition system 300, risk control document composition system 400, risk control document composition system 500, risk control document composition system 600, risk control document composition system 700, risk control document composition system 800, the remote devices 1220, or a combination thereof. The user interface 1212 may include an input device and an output device. Examples of the input device of the user interface 1212 may include a keypad, buttons, switches, touchpads, soft-keys, a keyboard, a mouse, or any combination thereof to provide data and communication inputs. Examples of the output device may include a display interface 1214. The control unit 1202 may operate the user interface 1212 to present information generated by the system 100, risk control document composition system 200, risk control document composition system 300, risk control document composition system 400, risk control document composition system 500, risk control document composition system 600, risk control document composition system 700, risk control document composition system 800, or a combination thereof. The control unit 1202 may also execute the software 1210 to present information generated by the system 100, risk control document composition system 200, risk control document composition system 300, risk control document composition system 400, risk control document composition system 500, risk control document composition system 600, risk control document composition system 700, risk control document composition system 800, or a combination thereof, or to control other functional units of the system 100, risk control document composition system 200, risk control document composition system 300, risk control document composition system 400, risk control document composition system 500, risk control document composition system 600, risk control document composition system 700, risk control document composition system 800, or a combination thereof. The display interface 1214 may be any graphical user interface such as a display, a projector, a video screen, or any combination thereof.

CONCLUSION

The above detailed description and embodiments of the disclosed systems, apparatuses, articles of manufacture, methods, and computer program products are not intended to be exhaustive or to limit the system, apparatus, article of manufacture, method, and computer program product embodiments disclosed herein to the precise form disclosed above. While specific examples for the disclosed systems, apparatuses, articles of manufacture, methods, and computer program products are described above for illustrative purposes, various equivalent modifications are possible within the scope of the disclosed systems, apparatuses, articles of manufacture, methods, and computer program products, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods can be implemented in a variety of different ways. Also, while processes or methods may at times be shown as being performed in series, these processes or blocks may instead be performed or implemented in parallel, or may be performed at different times.

The system, apparatus, article of manufacture, method, and computer program product embodiments disclosed herein are cost-effective, highly versatile, and accurate, and may be implemented by adapting components for ready, efficient, and economical manufacturing, application, and utilization. Another important aspect of embodiments of the present disclosure is that they valuably support and service the trend of reducing costs, simplifying systems, and/or increasing system performance.

These and other valuable aspects of the embodiments of the present disclosure consequently further the state of the technology to at least the next level. While the disclosed embodiments have been described as the best mode of implementing the system 100, risk control document composition system 200, risk control document composition system 300, risk control document composition system 400, risk control document composition system 500, risk control document composition system 600, risk control document composition system 700, and risk control document composition system 800, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense. Accordingly, the disclosure is not to be restricted except in light of the attached claims and their equivalents.

What is claimed is:

1. A computer-implemented method for automatically identifying risk control features and entities in a risk control document, the computer-implemented method comprising:

transforming, by a generative machine learning (ML) model, the risk control document into sequences of words;

classifying, by the generative ML model, risk control features associated with the sequences of words, wherein the risk control features include at least one problem;

pairing, by the generative ML model, the sequences of words with the classified risk control features;

identifying, by a natural language processing (NLP) model, syntactic characteristics of the sequences of words;

correcting, by a discriminative predictor system, the at least one problem of the classified risk control features based on the identified syntactic characteristics;

pairing, by the discriminative predictor system, text boundaries with the corrected classified risk control features; and generating a revised risk control document based on the corrected classified risk control features within the text boundaries.

2. The computer-implemented method of claim 1, wherein the risk control features comprise:

a first risk control feature indicative of an entity responsible for performing a risk control action identified in the risk control document;

a second risk control feature indicative of when the risk control action is to be performed;

a third risk control feature indicative of a description of the risk control action;

a fourth risk control feature indicative of a reason for the risk control action; and a fifth risk control feature indicative of how a risk is mitigated by a performance of the risk control action.

3. The computer-implemented method of claim 1, further comprising:

classifying, by the generative ML model, risk control entities in the risk control document; and correcting, by the discriminative predictor system, at least one problem of the classified risk control entities based on the corrected classified risk control features.

4. The computer-implemented method of claim 1, further comprising:
predicting, by the generative ML model, a first quality value for the risk control document based on the classified risk control features; and
determining, by the discriminative predictor system, a second quality value for the risk control document based on the first quality value and the corrected classified risk control features.

5. The computer-implemented method of claim 1, further comprising:
tagging, by the generative ML model, the sequences of words with beginning-inside-outside (BIO) tags, wherein a token in each respective sequence of words is tagged with a respective BIO tag indicative of a respective classified risk control feature associated with the respective sequence of words; and
correcting, by the NLP model, the at least one problem of the classified risk control features further based on the tagged sequence of words.

6. The computer-implemented method of claim 1, wherein the generative ML model comprises an attention-based transformer neural network comprising neural network layers specialized for risk control documents.

7. The computer-implemented method of claim 1, wherein the generative ML model is trained by a process comprising:
receiving, by the generative ML model, a corpus of risk control documents;
generating, by the generative ML model for each risk control document in the corpus, a modified risk control document by performing operations comprising:
replacing words with synonyms of the words,
inserting punctuation,
removing punctuation,
changing sentences from active voice to passive voice, or
changing sentences from passive voice to active voice;
masking, by the generative ML model, phrases in each modified risk control document;
regenerating, by the generative ML model, the masked phrases in each modified risk control document;
classifying, by the generative ML model, the risk control features associated with the regenerated masked phrases;
matching, by the NLP model, the regenerated masked phrases with corresponding phrases in the corpus of risk control documents; and
determining, by the NLP model, whether each of the classified risk control features is correct based on the matched regenerated masked phrases and by supplementary domain specific knowledge.

8. A non-transitory computer readable medium including instructions for causing a processor to perform operations for automatically identifying risk control features and entities in a risk control document, the operations comprising:
transforming, by a generative machine learning (ML) model, the risk control document into sequences of words;
classifying, by the generative ML model, risk control features associated with the sequences of words;
pairing, by the generative ML model, the sequences of words with the classified risk control features, wherein the risk control features include at least one problem;
identifying, by a natural language processing (NLP) model, syntactic characteristics of the sequences of words;
correcting, by a discriminative predictor system, the at least one problem of the classified risk control features based on the identified syntactic characteristics;
pairing, by the discriminative predictor system, text boundaries with the corrected classified risk control features; and
generating, by the discriminative predictor system, a revised risk control document based on the corrected classified risk control features within the text boundaries.

9. The non-transitory computer readable medium of claim 8, wherein the risk control features comprise:
a first risk control feature indicative of an entity responsible for performing a risk control action identified in the risk control document;
a second risk control feature indicative of when the risk control action is to be performed;
a third risk control feature indicative of a description of the risk control action;
a fourth risk control feature indicative of a reason for the risk control action; and
a fifth risk control feature indicative of how a risk is mitigated by a performance of the risk control action.

10. The non-transitory computer readable medium of claim 8, wherein the operations further comprise:
classifying, by the generative ML model, risk control entities in the risk control document; and
correcting, by the discriminative predictor system, at least one problem of the classified risk control entities based on the corrected classified risk control features.

11. The non-transitory computer readable medium of claim 8, wherein the operations further comprise:
predicting, by the generative ML model, a first quality value for the risk control document based on the classified risk control features; and
determining, by the discriminative predictor system, a second quality value for the risk control document based on the first quality value and the corrected classified risk control features.

12. The non-transitory computer readable medium of claim 8, wherein the operations further comprise:
tagging, by the generative ML model, the sequences of words with beginning-inside-outside (BIO) tags, wherein each respective sequence of words is tagged with a respective BIO tag indicative of a respective classified risk control feature associated with the respective sequence of words; and
correcting, by the NLP model, the at least one problem of the classified risk control features further based on the tagged sequence of words and domain specific knowledge.

13. The non-transitory computer readable medium of claim 8, wherein the generative ML model comprises an attention-based transformer neural network comprising neural network layers specialized for risk control documents.

14. The non-transitory computer readable medium of claim 8, wherein the generative ML model is trained by a process comprising:
receiving, by the generative ML model, a corpus of risk control documents;
generating, by the generative ML model for each risk control document in the corpus, a modified risk control document by performing operations comprising:
replacing words with synonyms of the words, inserting punctuation,
removing punctuation,
changing sentences from active voice to passive voice, or
changing sentences from passive voice to active voice;
masking, by the generative ML model, phrases in each modified risk control document;
regenerating, by the generative ML model, the masked phrases in each modified risk control document;
classifying, by the generative ML model, the risk control features associated with the regenerated masked phrases;
matching, by the NLP model, the regenerated masked phrases with corresponding phrases in the corpus of risk control documents; and
determining, by the NLP model, whether each of the classified risk control features is correct based on the matched regenerated masked phrases and domain specific knowledge.

15. A computing system for automatically identifying risk control features and entities in a risk control document, the computing system comprising:
a storage unit configured to store instructions;
a control unit, coupled to the storage unit, configured to process the stored instructions to perform operations comprising:
  transforming, by a generative machine learning (ML) model, the risk control document into sequences of words;
  classifying, by the generative ML model, risk control features associated with the sequences of words, wherein the risk control features include at least one problem;
  pairing, by the generative ML model, the sequences of words with the classified risk control features;
  identifying, by a natural language processing (NLP) model, syntactic characteristics of the sequences of words;
  correcting, by a discriminative predictor system, the at least one problem of the classified risk control features based on the identified syntactic characteristics;
  pairing, by the discriminative predictor system, text boundaries with the corrected classified risk control features;
  generating, by the discriminative predictor system, a revised risk control document based on the corrected classified risk control features within the text boundaries.

16. The computing system of claim 15, wherein the risk control features comprise:
a first risk control feature indicative of an entity responsible for performing a risk control action identified in the risk control document;
a second risk control feature indicative of when the risk control action is to be performed;
a third risk control feature indicative of a description of the risk control action;
a fourth risk control feature indicative of a reason for the risk control action; and
a fifth risk control feature indicative of how a risk is mitigated by a performance of the risk control action.

17. The computing system of claim 15, wherein the operations further comprise:
classifying, by the generative ML model, risk control entities in the risk control document; and
correcting, by the discriminative predictor system, at least one problem of the classified risk control entities based on the corrected classified risk control features.

18. The computing system of claim 15, wherein the operations further comprise:
predicting, by the generative ML model, a first quality value for the risk control document based on the classified risk control features; and
determining, by the discriminative predictor system, a second quality value for the risk control document based on the first quality value and the corrected classified risk control features.

19. The computing system of claim 15, wherein the operations further comprise:
tagging, by the generative ML model, the sequences of words with beginning-inside-outside (BIO) tags, wherein each respective sequence of words is tagged with a respective BIO tag indicative of a respective classified risk control feature associated with the respective sequence of words; and
correcting, by the NLP model, the at least one problem of the classified risk control features further based on the tagged sequence of words and domain specific knowledge.

20. The computing system of claim 15, wherein the generative ML model is trained by a process comprising:
receiving, by the generative ML model, a corpus of risk control documents;
generating, by the generative ML model for each risk control document in the corpus, a modified risk control document by performing operations comprising:
  replacing words with synonyms of the words,
  inserting punctuation,
  removing punctuation,
  changing sentences from active voice to passive voice, or
  changing sentences from passive voice to active voice;
masking, by the generative ML model, phrases in each modified risk control document;
regenerating, by the generative ML model, the masked phrases in each modified risk control document;
classifying, by the generative ML model, the risk control features associated with the regenerated masked phrases;
matching, by the NLP model, the regenerated masked phrases with corresponding phrases in the corpus of risk control documents; and
determining, by the NLP model, whether each of the classified risk control features is correct based on the matched regenerated masked phrases and domain specific knowledge.

* * * * *